United States Patent
Shah et al.

(10) Patent No.: US 9,802,373 B2
(45) Date of Patent: Oct. 31, 2017

(54) METHODS FOR PROCESSING THREE-DIMENSIONAL PRINTED OBJECTS USING MICROWAVE RADIATION

(71) Applicant: APPLIED NANOSTRUCTURED SOLUTIONS, LLC, Baltimore, MD (US)

(72) Inventors: Tushar K. Shah, Fulton, MD (US); John J. Morber, Taneytown, MD (US); Han Liu, Lutherville-Timonium, MD (US)

(73) Assignee: Applied Nanostructured Solutions, LLC, Baltimore, MD (US)

( * ) Notice: Subject to any disclaimer, the term of this patent is extended or adjusted under 35 U.S.C. 154(b) by 221 days.

(21) Appl. No.: 14/732,576

(22) Filed: Jun. 5, 2015

(65) Prior Publication Data
US 2015/0360427 A1    Dec. 17, 2015

Related U.S. Application Data

(60) Provisional application No. 62/010,973, filed on Jun. 11, 2014, provisional application No. 62/010,977, filed on Jun. 11, 2014.

(51) Int. Cl.
*B29C 71/04* (2006.01)
*B29C 71/02* (2006.01)
(Continued)

(52) U.S. Cl.
CPC .......... *B29C 71/04* (2013.01); *B29C 35/0272* (2013.01); *B29C 67/0055* (2013.01);
(Continued)

(58) Field of Classification Search
CPC ........ B29C 35/0272; B29C 2035/0855; B29C 67/0055; B29C 67/0059; B29C 67/007;
(Continued)

(56) References Cited

U.S. PATENT DOCUMENTS

| 6,404,403 B1 | 6/2002 | Kunz et al. |
| 6,713,389 B2 | 3/2004 | Speakman |

(Continued)

FOREIGN PATENT DOCUMENTS

| CA | 2835545 A1 | 11/2012 |
| EP | 2383225 A1 | 11/2011 |

(Continued)

OTHER PUBLICATIONS

Thostenson, et al., "Advances in the science and technology of carbon nanotubes and their composites: a review," Composites Science and Technology, 2001, pp. 1899-1912, vol. 61.

(Continued)

*Primary Examiner* — Leo B Tentoni
(74) *Attorney, Agent, or Firm* — McDermott Will & Emery LLP

(57) ABSTRACT

Objects produced by conventional three-dimensional printing methods are often incompletely consolidated and are not easily repaired. Printing compositions to address this issue can include a solidifiable matrix and a microwave absorber dispersed in the solidifiable matrix. The microwave absorber can be a plurality of carbon nanostructures containing a plurality of carbon nanotubes that are branched, crosslinked, and share common walls with one another. Methods for processing a three-dimensional printed object can include: providing a three-dimensional printed object formed from a printing composition containing a solidifiable matrix and a microwave absorber dispersed in the solidifiable matrix, and applying a focused input of microwave radiation to the printed object at one or more locations. Applying the microwave radiation heats the microwave absorber at the one or more locations and promotes consolidation of the printing composition within the printed object.

19 Claims, 14 Drawing Sheets

(51) Int. Cl.
   *B29C 67/00* (2017.01)
   *B29C 35/02* (2006.01)
   *B29K 101/12* (2006.01)
   *B29K 105/16* (2006.01)
   *B29K 507/04* (2006.01)
   *B29L 31/00* (2006.01)
   *B33Y 10/00* (2015.01)
   *B33Y 70/00* (2015.01)
   *B29C 35/08* (2006.01)
   *B33Y 40/00* (2015.01)

(52) U.S. Cl.
   CPC .......... *B29C 67/0059* (2013.01); *B29C 71/02* (2013.01); *B29C 67/0051* (2013.01); *B29C 2035/0855* (2013.01); *B29K 2101/12* (2013.01); *B29K 2105/167* (2013.01); *B29K 2507/04* (2013.01); *B29K 2995/0078* (2013.01); *B29L 2031/772* (2013.01); *B33Y 10/00* (2014.12); *B33Y 40/00* (2014.12); *B33Y 70/00* (2014.12)

(58) Field of Classification Search
   CPC .............. B29C 71/04; B29K 2105/046; B29K 2105/167; B29K 2507/04
   USPC .................................................. 264/413, 489
   See application file for complete search history.

(56) References Cited

U.S. PATENT DOCUMENTS

| | | |
|---|---|---|
| 7,461,970 B2 | 12/2008 | Brown |
| 8,597,557 B1 | 12/2013 | Torkelson et al. |
| 9,107,292 B2 | 8/2015 | Shah et al. |
| 2002/0112804 A1 | 8/2002 | Woods et al. |
| 2004/0191157 A1 | 9/2004 | Harutyunyan et al. |
| 2004/0232583 A1 | 11/2004 | Monsheimer et al. |
| 2005/0074392 A1 | 4/2005 | Yang et al. |
| 2005/0255321 A1 | 11/2005 | Zhu et al. |
| 2006/0099135 A1 | 5/2006 | Yodh et al. |
| 2007/0237959 A1 | 10/2007 | Lemaire |
| 2007/0243124 A1 | 10/2007 | Baughman et al. |
| 2007/0292622 A1 | 12/2007 | Rowley et al. |
| 2007/0298669 A1 | 12/2007 | Barrera et al. |
| 2008/0075954 A1 | 3/2008 | Wardle et al. |
| 2008/0153188 A1 | 6/2008 | Ohki et al. |
| 2008/0187648 A1 | 8/2008 | Hart et al. |
| 2008/0312349 A1 | 12/2008 | Yeager et al. |
| 2008/0317660 A1 | 12/2008 | Pan et al. |
| 2009/0017211 A1 | 1/2009 | Gruner et al. |
| 2009/0035469 A1 | 2/2009 | Sue et al. |
| 2009/0068461 A1 | 3/2009 | Reneker et al. |
| 2009/0142558 A1 | 6/2009 | Jiao et al. |
| 2009/0306270 A1 | 12/2009 | Noguchi et al. |
| 2010/0003503 A1 | 1/2010 | Seppala et al. |
| 2010/0173228 A1 | 7/2010 | Wallace et al. |
| 2011/0024694 A1 | 2/2011 | Shah et al. |
| 2011/0081770 A1 | 4/2011 | Tombler, Jr. |
| 2011/0114557 A2 | 5/2011 | Johnson et al. |
| 2011/0124483 A1 | 5/2011 | Shah et al. |
| 2011/0174519 A1 | 7/2011 | Shah et al. |
| 2011/0186775 A1 | 8/2011 | Shah et al. |
| 2011/0245384 A1 | 10/2011 | Bismarck et al. |
| 2012/0000691 A1 | 1/2012 | Shah et al. |
| 2012/0058296 A1 | 3/2012 | Shah et al. |
| 2012/0070667 A1 | 3/2012 | Malet et al. |
| 2012/0129391 A1 | 5/2012 | Van Swearingen et al. |
| 2012/0219881 A1 | 8/2012 | Sivarajan |
| 2012/0234694 A1 | 9/2012 | Vecitis et al. |
| 2012/0247800 A1 | 10/2012 | Shah et al. |
| 2012/0256139 A1 | 10/2012 | Hunt et al. |
| 2012/0280430 A1 | 11/2012 | Jones |
| 2013/0101495 A1 | 4/2013 | Peterson et al. |
| 2014/0021171 A1 | 1/2014 | Jerby et al. |
| 2014/0093728 A1 | 4/2014 | Shah et al. |
| 2014/0094541 A1 | 4/2014 | Shah et al. |
| 2014/0097146 A1 | 4/2014 | Shah et al. |
| 2014/0097917 A1 | 4/2014 | Shah et al. |
| 2014/0099493 A1 | 4/2014 | Liu et al. |
| 2014/0134335 A1 | 5/2014 | Pridoehl et al. |
| 2016/0325491 A1* | 11/2016 | Sweeney ............ B29C 67/0055 |

FOREIGN PATENT DOCUMENTS

| | | |
|---|---|---|
| WO | WO-2007/094757 A2 | 8/2007 |
| WO | WO-2007/099975 A1 | 9/2007 |
| WO | WO-2007/143018 A2 | 12/2007 |
| WO | WO-2008/000163 A1 | 1/2008 |
| WO | WO-2008/034939 A1 | 3/2008 |
| WO | WO-2008/110166 A1 | 9/2008 |
| WO | WO-2009/063008 A1 | 5/2009 |
| WO | WO-2010/144183 A1 | 12/2010 |
| WO | WO-2011/060033 A1 | 5/2011 |
| WO | WO-2011/141755 A1 | 11/2011 |
| WO | WO-2011/153629 A1 | 12/2011 |
| WO | WO-2014/055701 A1 | 4/2014 |

OTHER PUBLICATIONS

Biro, et al., "Carbon nanotube Y junctions: growth and properties," Diamond and Related Materials, 2004, pp. 241-249, vol. 13.

\* cited by examiner

METHODS FOR PROCESSING THREE-DIMENSIONAL PRINTED OBJECTS USING MICROWAVE RADIATION

CROSS-REFERENCE TO RELATED APPLICATIONS

This application claims the benefit of priority under 35 U.S.C. §119 from U.S. Provisional Patent Applications 62/010,973 and 62/010,977, each filed on Jun. 11, 2014 and incorporated herein by reference in its entirety.

STATEMENT REGARDING FEDERALLY SPONSORED RESEARCH OR DEVELOPMENT

Not applicable.

FIELD

The present disclosure generally relates to three-dimensional printing and, more particularly, to the use of microwave heating in conjunction with three-dimensional printing.

BACKGROUND

Three-dimensional (3-D) printing, also known as additive manufacturing, is a rapidly growing technology area that operates by depositing small droplets or streams of a melted or solidifiable printing material in precise deposition locations under control of a computer. Deposition of the printing material results in gradual, layer-by-layer buildup of an object, which can be in any number of complex shapes. Printing materials that can be used in three-dimensional printing include polymers and other solidifiable substances.

One of the shortcomings associated with conventional three-dimensional printing methods is incomplete fusion of the melted or solidifiable printing material within the printed object. As used herein, the term "fusion" will refer to the consolidation of a deposited printing composition to form a coherent structure. The terms "fusion" and "consolidation" may be used synonymously herein. Incomplete fusion of the printing material can be especially prevalent between adjacent layers of a printed object, which can result in structural weak points. In addition to producing structural weakness, incomplete fusion of the printing material can convey surface roughness to printed objects on at least a microscopic level, thereby resulting in a "pixelated" appearance under magnification. Presently, there are no effective ways to repair or post-process printed objects in order to rectify these issues. In contrast, traditional manufacturing techniques, such as molding and/or machining, generally form objects that are more homogenous in nature, contain fewer structural weak points, and have a smoother surface morphology.

Despite their shortcomings, objects produced by conventional three-dimensional printing methods can often be sufficient for rapid prototyping purposes. In this regard, prototypes having a variety of shapes and sizes can be produced, and tolerances are usually limited only by the size of the printer's deposition nozzles. Rapid production of prototypes represents a significant strength of three-dimensional printing, and there is concurrent interest in applying printing methods for mass manufacturing. For mass manufacturing purposes, however, the aforementioned defects resulting from incomplete fusion during printing can problematic, particularly for producing high-performance and/or exacting-tolerance objects with a desired degree of durability and quality. Although incomplete fusion can be mitigated somewhat by reducing the size of the deposition nozzles, albeit at the drawbacks of increased printing times and associated higher costs, there is currently no way to fully address the issue of poor fusion either during or after three-dimensional printing processes.

In view of the foregoing, increasing the extent of fusion within printed objects would be of significant interest in the art. The present disclosure satisfies the foregoing need and provides related advantages as well.

SUMMARY

In various embodiments, the present disclosure provides methods for processing of three-dimensional printed objects formed from a printing composition containing a solidifiable matrix and microwave absorber. In more particular embodiments, the microwave absorber can be a plurality of carbon nanostructures dispersed in the solidifiable matrix. The carbon nanostructures include a plurality of carbon nanotubes that are branched, crosslinked, and share common walls with one another.

In some embodiments, the present disclosure provides methods that include: providing a three-dimensional printed object formed from a printing composition containing a solidifiable matrix and a microwave absorber dispersed in the solidifiable matrix, and applying a focused input of microwave radiation to the printed object at one or more locations. Applying the focused input of microwave radiation heats the microwave absorber at the one or more locations and promotes consolidation of the printing composition within the printed object.

In more particular embodiments, the present disclosure provides methods that include: depositing a printing composition in a layer-by-layer deposition process to form a three-dimensional printed object, placing a microwave transmission line in proximity to the printed object, establishing a standing wave in the microwave transmission line, and after depositing the printing composition to form the printed object, contacting the standing wave with the printed object at one or more locations. The printing composition contains a solidifiable matrix and a plurality of carbon nanostructures dispersed in the solidifiable matrix. The carbon nanostructures include a plurality of carbon nanotubes that are branched, crosslinked, and share common walls with one another. Contacting the standing wave with the printed object at one or more locations heats the carbon nanostructures at the one or more locations and promotes consolidation of the printing composition within the printed object.

In other various embodiments, the present disclosure provides methods for decomposing the solidifiable matrix of a three-dimensional printed object. The methods include: providing a three-dimensional printed object formed from a printing composition containing a solidifiable matrix and a microwave absorber dispersed in the solidifiable matrix, and applying a focused input of microwave radiation to the printed object at one or more locations. Applying the focused input of microwave radiation heats the microwave absorber at the one or more locations. Heating of the microwave absorber continues until the solidifiable matrix decomposes at the one or more locations.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figures 1A, 1B, 1C:
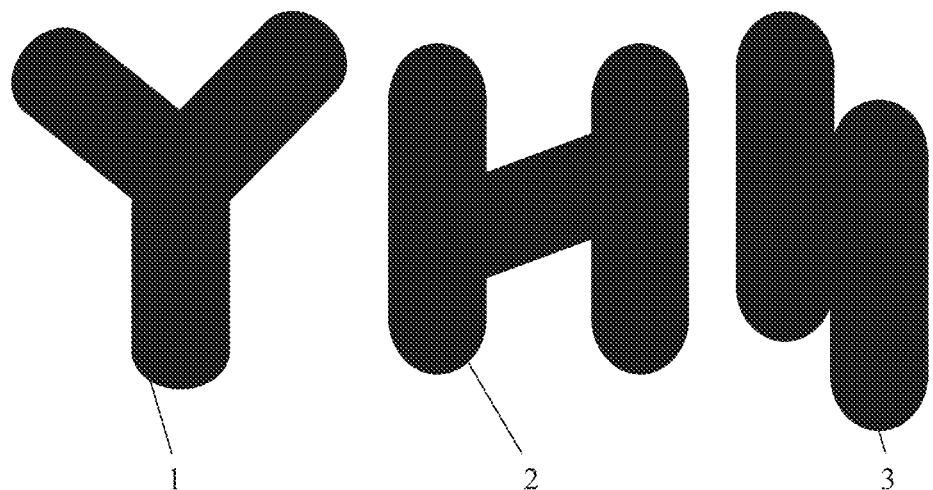
FIGS. 1A-1C show illustrative depictions of carbon nanotubes that are branched, crosslinked, and share common walls, respectively.

The present disclosure is directed, in part, to methods for consolidating, repairing or smoothing a three-dimensional printed object containing a microwave absorber, such as carbon nanostructures. The present disclosure is also directed, in part, to methods for removing a portion of the solidifiable matrix of a three-dimensional printed object containing a microwave absorber, such as carbon nanostructures.

Carbon nanotubes (CNTs) have been widely proposed for use in a number of applications in order to take advantage of their beneficial combination of chemical, mechanical, electrical, and thermal properties. Various difficulties occur when working with individual carbon nanotubes, however. These difficulties include, but are not limited to, poor solvent solubility, limited dispersibility in composite matrices, inadequate purity, and the like. Without being bound by any theory or mechanism, it is believed that many of these issues can arise due to the strong van der Waals forces that occur between individual carbon nanotubes, thereby causing them to agglomerate into bundles or ropes, as commonly known in the art. Although there are various techniques available for de-bundling carbon nanotubes into individual, well-separated members, many of these techniques can detrimentally impact the desirable properties of pristine carbon nanotubes. Concerns have also been raised regarding the environmental health and safety profile of individual carbon nanotubes due to their small size. Finally, the cost of producing individual carbon nanotubes can be prohibitive for the commercial viability of these entities in many instances.

One interesting property of carbon nanotubes is their ability to strongly absorb microwave radiation. Absorption of microwave radiation by the carbon nanotubes causes heating to occur.

In the context of three-dimensional printing, the present inventors recognized that if a printed object could be made strongly absorbent toward microwave radiation, such as by incorporating carbon nanotubes or another microwave absorber therein, induced heating upon microwave irradiation during or after printing could be used to affect consolidation within the printed object and/or to smooth its surface. The terms "part," "tool" and "article" may be used synonymously herein with the term "object." In particular, the inventors recognized that post-printing re-heating of a printed object can be used to affect the object's consolidation, which can provide enhanced strength, surface smoothing, and/or damage repair. Although the strong microwave absorption of carbon nanotubes would otherwise make them a viable candidate for use as a microwave absorber in printed objects, the general difficulties associated with as-produced carbon nanotubes and their problematic dispersion characteristics can make them unsuitable for use in conventional three-dimensional printing methods.

In order to address the shortcomings presented by ordinary carbon nanotubes, at least some of the present inventors previously developed techniques to prepare carbon nanostructures in free form following their initial growth on a substrate. Illustrative techniques for producing carbon nanostructures on a growth substrate, followed by release therefrom, are described in more detail in commonly owned U.S. Patent Application Publications 2013/0101495 and 2014/0093728, each of which is incorporated herein by reference in its entirety. As used herein, the term "carbon nanostructure" will refer to a plurality of carbon nanotubes that exist as a polymeric structure by being interdigitated, branched, crosslinked, and/or sharing common walls with one another. Carbon nanostructures can be considered to have carbon nanotubes present as a base monomer unit of their polymeric structure. Whereas conventional carbon nanotube growth processes have most often focused on the production of high-purity carbon nanotubes containing a minimum number of defect sites, carbon nanostructure growth processes employ nominal carbon nanotube growth rates on the order of several microns per second to rapidly produce the defect-laden carbon nanostructure morphology.

Free carbon nanostructures at least partially alleviate certain difficulties otherwise associated with ordinary carbon nanotubes. Whereas ordinary carbon nanotubes are not easily dispersed in a matrix material due to strong nanotube-to-nanotube interactions, the structural morphology of carbon nanostructures allows these entities to be much more easily dispersed. Essentially, the as-produced structural morphology of carbon nanostructures places the carbon nanotubes therein in a fixed, pre-exfoliated (i.e., at least partially separated) state, thereby making them much more easily dispersible in a matrix material. Moreover, because carbon nanostructures are macroscopic in size relative to individual carbon nanotubes and are not prone to shedding of submicron particles, carbon nanostructures can present an improved environmental health and safety profile compared to individual carbon nanotubes. As a further advantage, the rapid growth rates for carbon nanostructures can alleviate the supply issues that can be problematic for individual carbon nanotubes.

Despite the significant differences existing in their morphology, carbon nanostructures retain many of the advantageous properties that characterize ordinary carbon nanotubes. With respect to the processing of three-dimensional printed objects, carbon nanostructures retain a strong absorption profile for microwave radiation, as discussed herein.

Whereas ordinary carbon nanotubes are considered to be unsuitable for use in three-dimension printing methods due to their poor dispersion characteristics, the present inventors discovered that carbon nanostructures are readily dispersible and can provide satisfactory matrix heating at readily attainable loading levels that are compatible with many aspects of existing three-dimensional printing technology. Further, the present inventors discovered that the strong microwave absorption afforded by the carbon nanostructures can help address the durability and quality issues that presently limit three-dimensional printing methods. Specifically, the inventors discovered that by utilizing a printing composition containing carbon nanostructures or another suitably dispersible microwave absorber and applying microwave radiation during or after fabrication of a printed object, improved consolidation within the object can be realized through microwave heating. In the case of applying microwave radiation during printing, microwave heating of one or more previously deposited layers of the object can improve their consolidation with each other and/or a subsequently deposited layer. In the case of applying microwave radiation following printing, reheating of the printed object can improve consolidation between layers and/or affect surface smoothing of the object. In addition, microwave reheating of a printed object can allow repair of a damaged object to take place in some cases. Improved structural integrity and quality can result in any of the foregoing situations. The use of microwave radiation in association with three-dimensional printing processes to accomplish the foregoing is believed to be entirely unconventional, since the printing compositions typically employed in three-dimensional printing processes do not interact significantly with microwaves.

In addition to their ability to promote consolidation of a printed object through absorption of microwave radiation, carbon nanostructures can also provide mechanical reinforcement effects as well. Hence, even discounting the consolidation effects attainable by practicing the embodiments of the present disclosure, improved structural integrity of a printed object can be realized.

As a further advantage, the inventors also recognized that microwave radiation of a sufficiently high frequency can affect highly localized "spot" heating of the solidifiable matrix within a printed object. By locally heating the solidifiable matrix in the printed object, consolidation can be promoted without inducing excessive heating throughout the object as a whole. By locally heating the printed object, rather than the printed object as a whole, heating-induced deformation effects can be limited. In addition to producing highly localized heating effects by modulating the microwave frequency, the depth of penetration within the printed object can also be adjusted.

As one way to provide a focused input of microwave radiation to a printed object, the present inventors discovered that a microwave transmission line can be placed in proximity to the printed object for delivery of microwave radiation thereto. Specifically, the inventors discovered that by establishing a standing wave (a standing microwave) in the transmission line, the standing wave can attain sufficient amplitude to contact an object at one or more precise locations and induce heating of the deposited carbon nanostructures, as discussed above. Further aspects of establishing a standing wave in a microwave transmission line and heating an object therewith will be discussed in greater detail below.

In still other aspects, the use of carbon nanostructures and other microwave absorbers in conjunction with three-dimensional printing processes can enable production of complex structures that would otherwise be unattainable by conventional manufacturing or three-dimensional printing processes. Specifically, the inventors determined that prolonged microwave heating can decompose the solidifiable matrix instead of consolidating it. Matrix decomposition can allow very complex structures to be defined in regions of a printed object that are otherwise inaccessible during conventional manufacturing or printing techniques (e.g., within the interior of an object). For example, by utilizing a sufficiently low frequency of microwave radiation to penetrate below the surface of a printed object or by varying the object's distance from a microwave emitter, matrix decomposition below the surface can be used to define a cavity or other structure within the interior of a printed object.

In various embodiments, the methods of the present disclosure utilize a printing composition containing a solidifiable matrix and a microwave absorber. In more particular embodiments, the microwave absorber can be a plurality of carbon nanostructures. As discussed above, carbon nanostructures are readily dispersible in the solidifiable matrix of printing compositions, and such printing compositions are compatible with conventional three-dimensional printing methods. The carbon nanostructures include a plurality of carbon nanotubes in which the carbon nanotubes are branched, crosslinked, and share common walls with one another. It is to be recognized that every carbon nanotube in the plurality of carbon nanotubes does not necessarily have the foregoing structural features of branching, crosslinking, and sharing common walls. Rather, the plurality of carbon nanotubes as a whole collectively possesses these structural features. That is, within carbon nanostructures, at least a portion of the carbon nanotubes are branched, at least a portion of the carbon nanotubes are crosslinked, and at least a portion of the carbon nanotubes share common walls. FIGS. 1A-1C show illustrative depictions of carbon nanotubes 1-3 that are branched, crosslinked, and share common walls, respectively. Shared-wall carbon nanotubes 3 are not merely carbon nanotubes that are abutted side-by-side with one another. Rather, in shared-wall carbon nanotubes 3, at least the outer carbon nanotube layer of a first carbon nanotube is indistinguishable from and contiguous with that of a second carbon nanotube. The carbon nanotubes within the carbon nanostructures can be formed with branching, crosslinking, and sharing common walls with one another during formation of the carbon nanostructures on a growth substrate, as discussed hereinafter.

Carbon nanostructures can have a web-like morphology that results in a low, but readily modified, bulk density. As-produced carbon nanostructures can have an initial bulk density ranging between about 0.003 g/cm$^3$ to about 0.015 g/cm$^3$. Densification and/or coating to produce a carbon nanostructure flake material or a like morphology can raise the bulk density to a range between about 0.1 g/cm$^3$ to about 0.15 g/cm$^3$. Further compaction can raise the bulk density to an upper limit of about 1 g/cm$^3$, with chemical modifications to the carbon nanostructures raising the bulk density to an upper limit of about 1.2 g/cm$^3$. In any event, the carbon nanostructures can remain readily dispersible in a solidifiable matrix for use in printing compositions of the present disclosure.

At least a portion of the carbon nanotubes can be aligned substantially parallel to one another in the carbon nanostructures. Without being bound by any theory or mechanism, it is believed that the formation of carbon nanotubes on a growth substrate under carbon nanostructure growth conditions can result in substantially vertical growth of at least a majority of the carbon nanotubes from the substrate surface. The structural features of branching, crosslinking, and shared carbon nanotube walls can become more prevalent as the growth density increases, particularly at locations on the carbon nanotubes that are further removed from the growth substrate. After removal of the carbon nanostructures from the growth substrate, the substantially parallel alignment of the carbon nanotubes can be maintained, as discussed below.

Figure 2:
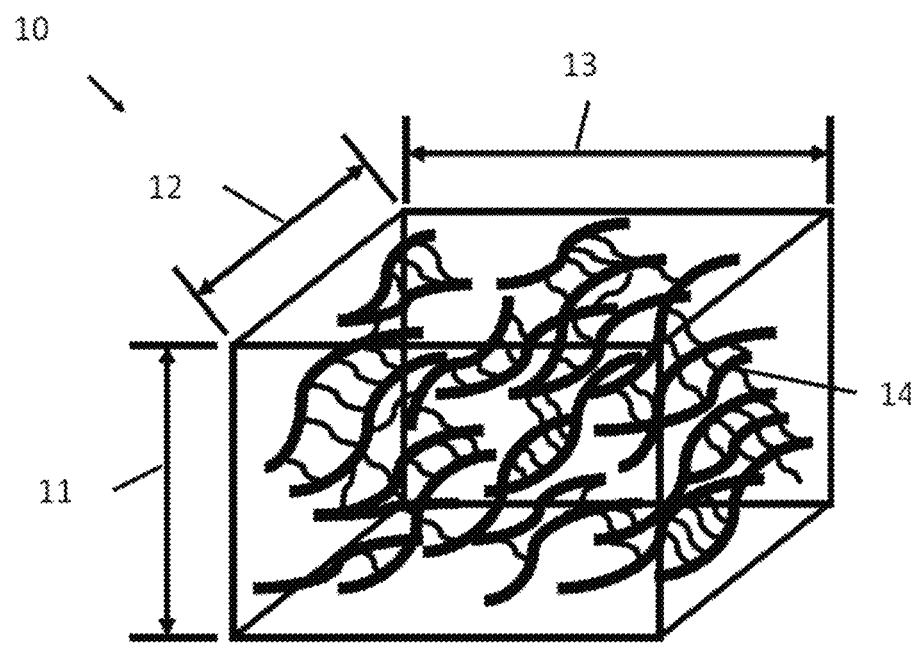
FIG. 2 shows an illustrative depiction of a carbon nanostructure flake material after isolation of carbon nanostructures from a growth substrate.

In some embodiments, the carbon nanostructures can be free of a growth substrate and in the form of a flake material after removal from the initial growth substrate. As used herein, the term "flake material" refers to a discrete particle having finite dimensions. FIG. 2 shows an illustrative depiction of a carbon nanostructure flake material after isolation of carbon nanostructures from a growth substrate. Flake structure 10 can have first dimension 11 that is in a range from about 1 nm to about 35 μm thick, particularly about 1 nm to about 500 nm thick, including any value in between and any fraction thereof. Flake structure 10 can have second dimension 12 that is in a range from about 1 micron to about 750 microns tall, including any value in between and any fraction thereof. Flake structure 10 can have third dimension 13 that is only limited in size based on the length of the growth substrate upon which the carbon nanostructures are initially formed. For example, in some embodiments, the process for growing carbon nanostructures on a growth substrate can take place on a tow or roving of a fiber-based material of spoolable dimensions. The carbon nanostructure growth process can be continuous, and the carbon nanostructures can extend the entire length of a spool of fiber. Thus, in some embodiments, third dimension 13 can be in a range from about 1 m to about 10,000 m wide. Again, third dimension 13 can be very long because it represents the dimension that runs along the axis of the growth substrate upon which the carbon nanostructures are formed. Third dimension 13 can also be decreased to any desired length less than 1 m. For example, in some embodiments, third dimension 13 can be on the order of about 1 micron to about 10 microns, or about 10 microns to about 100 microns, or about 100 microns to about 500 microns, or about 500 microns to about 1 cm, or about 1 cm to about 100 cm, or about 100 cm to about 500 cm, up to any desired length, including any amount between the recited ranges and any fractions thereof. Since the growth substrates upon which carbon nanostructures are formed can be quite large, exceptionally high molecular weight carbon nanostructures can be produced.

Referring still to FIG. 2, flake structure 10 can include a webbed network of carbon nanotubes 14 in the form of a carbon nanotube polymer (i.e., a "carbon nanopolymer") having a molecular weight in a range from about 15,000 g/mol to about 150,000 g/mol, including all values in between and any fraction thereof. In some embodiments, the upper end of the molecular weight range can be even higher, including about 200,000 g/mol, about 500,000 g/mol, or about 1,000,000 g/mol. The higher molecular weights can be associated with carbon nanostructures that are dimensionally long. In various embodiments, the molecular weight can also be a function of the predominant carbon nanotube diameter and number of carbon nanotube walls present within the carbon nanostructure. In some embodiments, the carbon nanostructures can have a crosslinking density ranging between about 2 mol/cm$^3$ to about 80 mol/cm$^3$. The crosslinking density can be a function of the carbon nanostructure growth density on the surface of the growth substrate as well as the carbon nanostructure growth conditions.

Figure 3A:
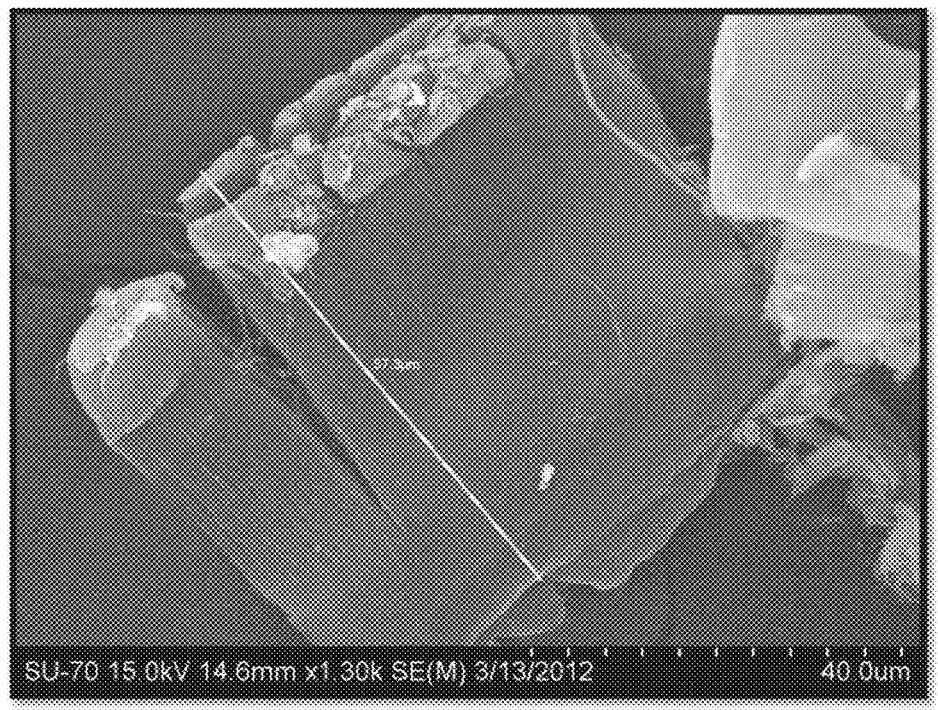
FIG. 3A shows an SEM image of an illustrative carbon nanostructure obtained as a flake material.
Figure 3B:
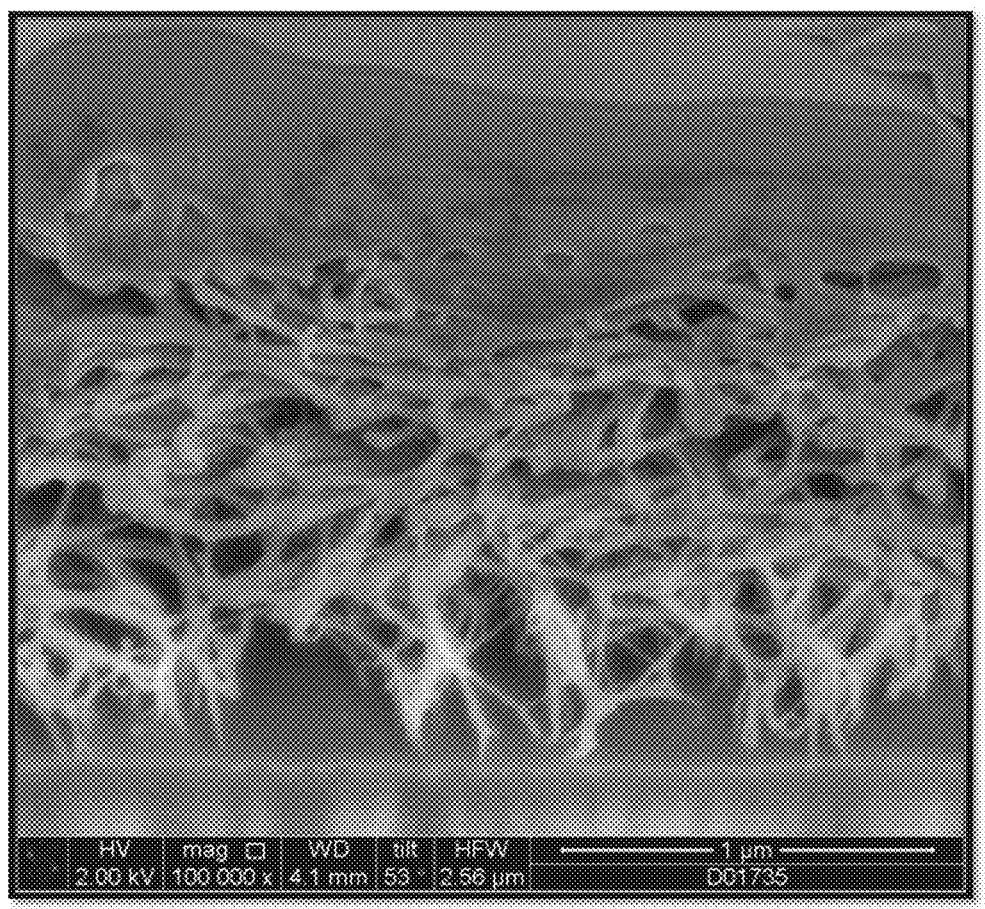
FIG. 3B shows a high magnification SEM image of the carbon nanotube morphology in carbon nanostructures.

FIG. 3A shows an SEM image of an illustrative carbon nanostructure obtained as a flake material. The carbon nanostructure shown in FIG. 3A exists as a three dimensional microstructure due to the entanglement and crosslinking of its aligned carbon nanotubes. FIG. 3B shows a high magnification SEM image of the carbon nanotube morphology in carbon nanostructures. Again, the aligned morphology is reflective of the formation of the carbon nanotubes on a growth substrate under rapid carbon nanotube growth conditions (e.g., several microns per second, such as about 2 microns per second to about 10 microns per second), thereby inducing substantially perpendicular carbon nanotube growth from the growth substrate and the accompanying carbon nanostructure morphology. Additional details regarding carbon nanostructures and methods for their production are discussed hereinbelow.

Although carbon nanostructures can be effectively utilized as the microwave absorber in the printing compositions of the present disclosure, it is to be recognized that other types of dispersible microwave absorbers can be utilized as well. For example, in some embodiments, the microwave absorption properties of metals can be utilized in order to realize the features and advantages of the present disclosure. In particular embodiments, a metallic microwave absorber suitable for inclusion in printing compositions of the present disclosure can be metal nanoparticles. As used herein, the term "nanoparticle" will refer to a particulate material having an equivalent spherical diameter of about 100 nm or less, although nanoparticles need not necessarily be spherical in shape. Suitable techniques for production and isolation of various types of metal nanoparticles will be familiar to one having ordinary skill in the art. Metal nanoparticles can be readily dispersible within the solidifiable matrix of printing compositions, much like carbon nanostructures. Although certain embodiments herein are described in reference to microwave heating of carbon nanostructures, it is to be recognized that metal nanoparticles can be substituted for carbon nanostructures or used in combination with carbon nanostructures in any particular configuration herein.

The solidifiable matrix of the printing composition can include any material that can be conventionally deposited in a three-dimensional printing process and in which the carbon nanostructures can be effectively dispersed. Moreover, suitable solidifiable matrices include those that can be softened or otherwise be further modified through microwave reheating according to the various methods of the present disclosure. In some embodiments, the solidifiable matrix can be a thermoplastic polymer. Upon forming a printed object, the thermoplastic polymer can solidify, and subsequent microwave irradiation can then soften the thermoplastic polymer to affect further consolidation within the printed object. In particular embodiments, suitable thermoplastic polymers that can be used in three-dimensional printing include, for example, polyketones, acrylonitrile-butadiene-styrene (ABS), polyetheretherketones (PEEK), polyamides, polyolefins (e.g., polyethylene, polypropylene and the like), polyethyleneimine (PEI), polycarbonates, and combinations thereof.

In various embodiments, a loading of carbon nanostructures in the solidifiable matrix can be less than about 30% by weight. In more particular embodiments, the carbon nanostructure loading can range between about 0.1% to about 30% by weight, or between about 1% to about 25% by weight, or between about 5% to about 20% by weight, or between about 1% to about 15% by weight, or between about 5% to about 10% by weight.

In various embodiments, methods described herein can include providing a three-dimensional printed object, the printed object being formed from a printing composition containing a solidifiable matrix and a microwave absorber dispersed in the solidifiable matrix; and applying a focused input of microwave radiation to the printed object at one or more locations, thereby heating the microwave absorber at the one or more locations and promoting consolidation of the printing composition within the printed object. As discussed above, in more particular embodiments, the microwave absorber can be a plurality of carbon nanostructures. In other various embodiments, the microwave absorber can contain metal nanoparticles.

As used herein, the term "microwave radiation" refers to the region of the electromagnetic spectrum having a frequency residing with a range of about 300 GHz to about 300 MHz (wavelengths of 1 mm to 1 m, respectively). In more particular embodiments of the present disclosure, the microwave radiation can have a frequency of about 1 GHz or higher, specifically within the range of about 1 GHz to about 300 GHz (wavelengths of 10 mm to 1 mm, respectively), or within the range of about 10 GHz to about 40 GHz (wavelengths of 10 mm to 7.5 mm, respectively). Microwave radiation having a frequency above about 10 GHz can be very effectively focused due to its small wavelength, thereby allowing extremely localized heating to take place within a printed object. In addition, microwave radiation having a frequency above about 10 GHz can exhibit a very low extent of penetration into the interior of an object, thereby allowing the carbon nanostructures or other microwave absorbers in proximity to the exterior of a printed object to undergo selective microwave heating. That is, in some embodiments, the focused input of microwave radiation can have a frequency such that interior portions of the printed object remain substantially unheated through direct absorption of microwaves, although some heating may occur through conduction.

At lower microwave frequencies, a greater extent of penetration and interior heating within the printed object can be realized. For example, at lower microwave frequencies within the range of about 1 GHz to about 10 GHz, carbon nanostructures or other microwave absorbers within the interior of the object can undergo heating in preference to those in proximity to the object's exterior. Moreover, because of the larger wavelengths at lower microwave frequencies, the heating effect is less localized.

In more particular embodiments, providing the three-dimensional printed object can include forming the printed object in a layer-by-layer deposition process. Accordingly, the focused input of microwave radiation is then applied after formation of the printed object is complete. The printed object is not considered to be particularly limited in identity, structure or size. Any structure that can be modeled as a three-dimensional CAD drawing can allow computer control to be realized for production of a printed object. Printed objects of arbitrary size can be prepared by using a three-dimensional printer having a suitably large stage for deposition of the printing composition. In still more particular embodiments of the present disclosure, the printing composition can be deposited as a plurality of droplets (e.g., sprayed), with at least a portion of the droplets becoming further consolidated upon applying microwave radiation to the finished printed object.

The focused input of microwave radiation can be directed upon an outer surface of the printed object or the interior of the printed object. As discussed above, modulation of the frequency of the microwave radiation can determine the depth of penetration of the microwave radiation into the printed object.

By heating carbon nanostructures or another microwave absorber in proximity to the exterior surface of the printed object, several beneficial effects can be recognized. In some embodiments, heating of the microwave absorber can promote consolidation of an outer layer of the printed object to an inner layer of the printed object. In some embodiments, heating of the microwave absorber can promote smoothing of an exterior surface of the printed object. In still other embodiments, heating of the microwave absorber can promote repair of damage within the printed object. Heating of the interior of the printed object can similarly promote consolidation between interior layers of the printed object and/or promote repair of interior damage within the object. Other effects of interior heating are also discussed hereinbelow.

Suitable microwave emitters for providing a focused input of microwave radiation can include both low-power and high-power microwave emitters. High-power microwave emitters that can be suitable for this purpose include, for example, magnetrons, klystrons, traveling-wave tubes, and gyrotrons. Low-power microwave emitters that can be suitable include, for example, field-effect transistors, tunnel diodes, Gunn diodes, impact ionization avalanche transit-time diodes, masers and the like. A feed horn or emitter horn sized for the particular wavelength of microwave radiation may be used. Microwave transmission lines and like structures, including microwave waveguides, can represent a particularly suitable type of microwave emitter for producing a focused input of microwave radiation in some embodiments of the present disclosure.

Figure 4:
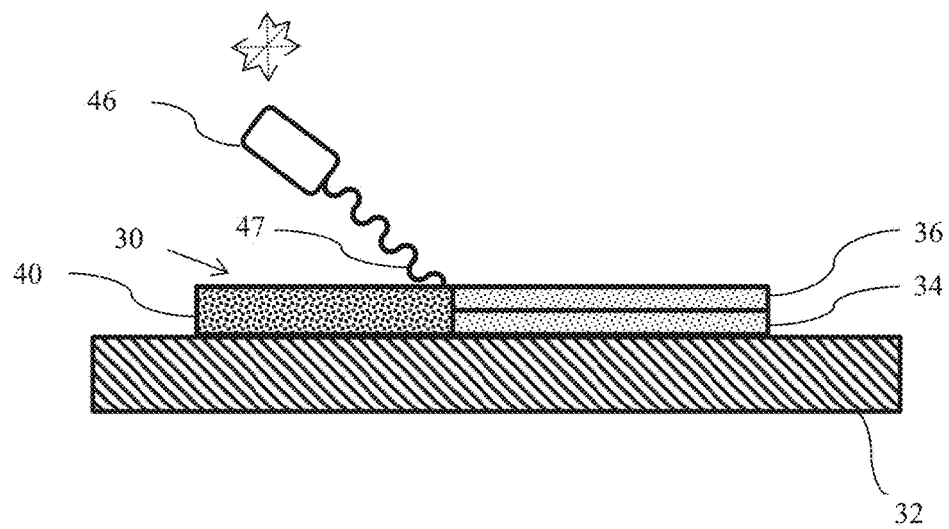
FIGS. 4-6 show illustrative schematics of a printed object undergoing post-production modification through exposure to a focused input of microwave radiation.
Figure 5:
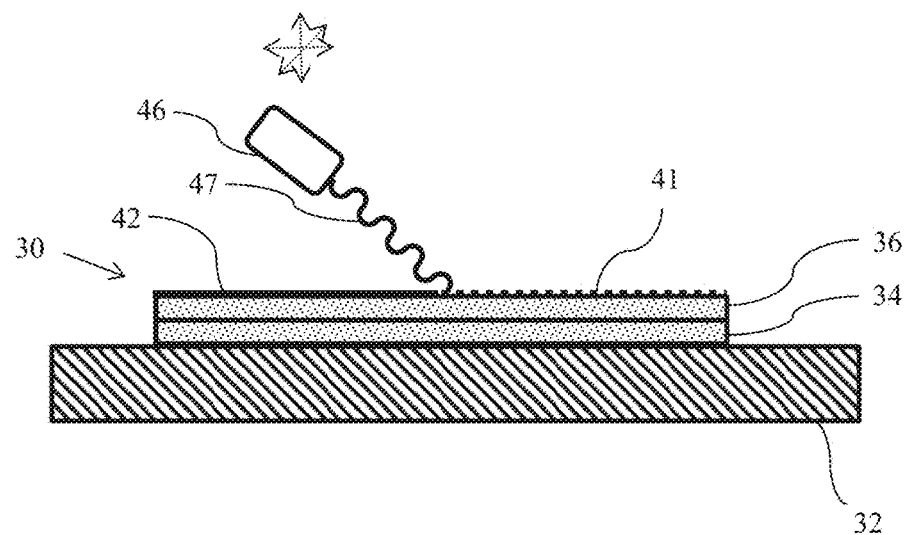
Figure 6:
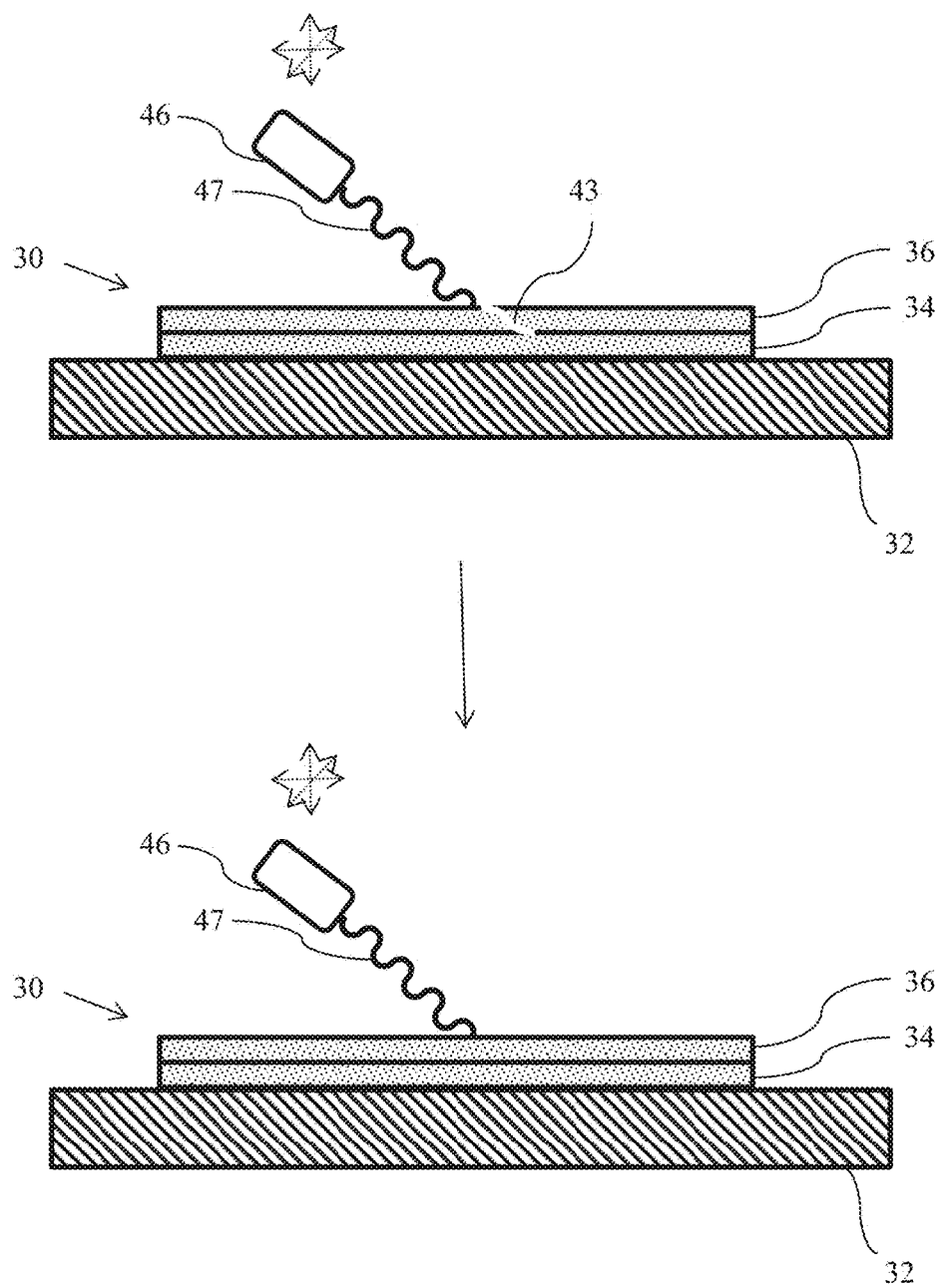

FIGS. 4-6 show illustrative schematics of a printed object undergoing post-production modification through exposure to a focused input of microwave radiation. FIG. 4 shows a printed object in the process of undergoing consolidation upon exposure to microwave radiation. Referring to FIG. 4, object 30 is present upon stage 32. Object 30 was previously formed during a three-dimensional printing process. As-deposited object 30 contained lower layer 34 and upper layer 36, which are incompletely consolidated with one another. Upon applying microwave radiation 47 from microwave emitter 46 across a portion of object 30, consolidation of lower layer 34 and upper layer 36 can be affected to form consolidated region 40, which may then be substantially homogenous in structure. Unconsolidated portions of lower layer 34 and upper layer 36 can similarly be consolidated by continuing to refocus microwave radiation 47 across object 30, thereby extending consolidated region 40. In order to refocus microwave radiation 47 upon object 30, either microwave emitter 46 or stage 32 can be moved two-dimensionally or three-dimensionally. In order to precisely direct microwave radiation 47 to a desired location, movement can take place under computer control.

FIGS. 5 and 6 similarly show how a printed object can undergo surface smoothing or damage repair upon exposure to microwave radiation. FIGS. 5 and 6 share several elements in common with FIG. 4 and may be better understood by reference thereto.

As shown in FIG. 5, as-deposited object 30 initially had roughened surface 41 present upon outer layer 36 or a consolidated variant thereof. By applying microwave radiation 47 from microwave emitter 46 to roughened surface 41, consolidation of the solidifiable matrix to form smoothed surface 42 can be realized. By continuing to refocus microwave radiation 47 from microwave emitter 46 across object 30, extension of smoothed surface 42 can be realized.

As shown in FIG. 6, damage 43 can be present within object 30. The damage can be, for example, a printing flaw or damage resulting from use of object 30 following printing. By applying microwave radiation 47 from microwave emitter 46 in proximity to damage 43, reconsolidation of the solidifiable matrix can occur to essentially remove the damage from object 30. Specifically, the solidifiable matrix in proximity to the damage can be reflowed through microwave heating in order to remove the damage. Focusing of microwave radiation 47 in proximity to damage 43 can take place visually or in response to an appropriate damage-sensing device. During damage removal, other benefits such as surface smoothing and/or further consolidation within object 30 can also be realized.

In more particular embodiments of the present disclosure, the present inventors discovered that a focused input of microwave radiation can be supplied by a microwave transmission line. More specifically, as discussed in greater detail hereinafter, a standing wave can be established or exhibited in the microwave transmission line such that the standing wave's amplitude is sufficiently great to contact the printed object at one or more locations and heat the carbon nanostructures or other microwave absorber therein. By modulating the frequency of the microwave radiation input to the microwave transmission line, as well as the length of the microwave transmission line itself, the locations at which the standing wave contacts the object can be very precisely modulated. The microwave frequency can be similar to those discussed above, such as within a range of about 100 MHz to about 50 GHz, although higher or lower frequencies may also be suitable. The relative proximity of the microwave transmission line and the printed object to one another can also be adjusted to alter the extent of contact between the printed object and the standing wave.

Figure 7:
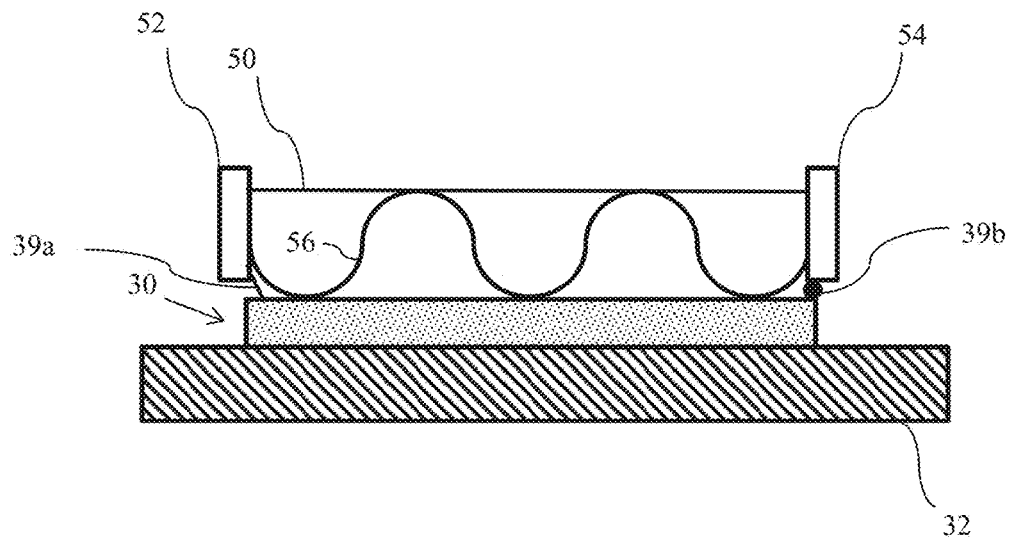
FIGS. 7 and 8 show illustrative schematics of a printed object undergoing post-production modification through exposure to a focused input of microwave radiation supplied from a microwave transmission line.
Figure 8:
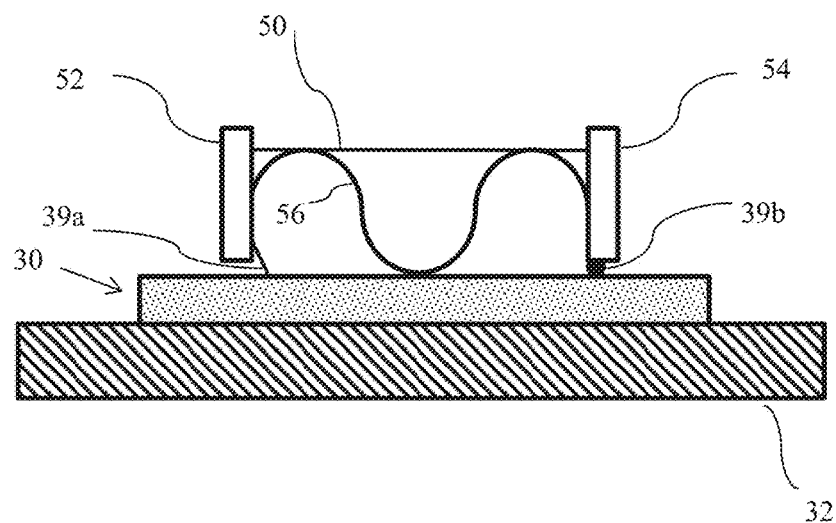

FIGS. 7 and 8 show illustrative schematics of a printed object undergoing post-production modification through exposure to a focused input of microwave radiation supplied from a microwave transmission line. FIGS. 7 and 8 share several elements in common with FIGS. 4-6 and may be better understood by reference thereto. It is to be recognized that any of the benefits discussed above in reference to FIGS. 4-6 (e.g., matrix consolidation, surface smoothing, and/or damage repair) can similarly be realized upon exposure to microwave radiation supplied from a microwave transmission line. In the interest of clarity and brevity, the particular modification being affected upon the printed object is not directly depicted in FIGS. 7 and 8.

As shown in FIG. 7, object 30 is present upon stage 32, where object 30 was deposited layer-by-layer in a prior three-dimensional printing process. Transmission line 50 extends between microwave input 52 and reflective load 54. Transmission line 50 is in electrical communication with object 30 by electrical connectors 39a and 39b, as depicted in FIGS. 7 and 8. In alternative embodiments, an electrical connection can similarly be established with stage 32, provided that stage 32 is electrically conductive. Electrical connectors 39a and 39b can be any structure that establishes a movable electrical connection with object 30 or stage 32. For example, electrical connectors 39a and 39b can be a spring-loaded conductive plate or leaf (39a) or a conductive roller (39b).

Upon interacting microwave radiation with reflective load 54 located at the terminus of transmission line 50, backward microwave reflection establishes standing wave 56 in transmission line 50. Standing wave 56 is generally sinusoidal in shape and its amplitude is sufficiently great that it is no longer constrained within transmission line 50. By placing transmission line 50 sufficiently close to object 30 and/or increasing the amplitude of standing wave 56, standing wave 56 can contact object 30 at one or more locations. At the locations where standing wave 56 contacts object 30, localized heating occurs due to interaction of microwave radiation with the carbon nanostructures or another microwave absorber. Although FIG. 7 has depicted standing wave 56 as contacting object 30 substantially tangentially at its surface, it is to be recognized that deeper microwave penetration can be realized by increasing the amplitude of standing wave 56 or positioning transmission line 50 and object 30 in closer proximity to one another.

Further, although FIG. 7 has depicted standing wave 56 as establishing multiple points of contact with object 30 and inducing heating therein, this is not necessary the case. As discussed above, standing wave 56 can be modulated by modifying the frequency of the microwave radiation input to transmission line 50 and/or the distance between microwave input 52 and reflective load 54. Modulation of the standing wave in this manner can modify the number and location of the points of contact by changing the number of nodes in the standing wave. For example, in some embodiments, the standing wave can contact the object at substantially a single location, as depicted in FIG. 8 and discussed in more detail below. Again, movement of microwave transmission line 50 or stage 32 can allow a focused input of microwave radiation to be directed to a desired location of object 30 in order to achieve the benefits of the disclosure herein. For example, as depicted in FIG. 8, standing wave 56 can be modulated to contact the object at a single location. In the particular configuration shown in FIG. 8, modulation of standing wave 56 includes shortening transmission line 50 by moving microwave input 52 and reflective load 54 closer to one another. However, modulation can also take place solely by modulation of the input frequency of the microwave radiation, as discussed above.

Moreover, the depth of penetration of standing wave 56 into object 30 can be adjusted by placing microwave transmission line 50 and object 30 in closer proximity to one another and/or increasing the amplitude of standing wave 56. By increasing the depth of penetration of standing wave 56 into object 30, a larger area of object 30 can undergo induced heating at any particular time.

Referring still to FIGS. 7 and 8, it is to be recognized that the points of contact with between standing wave 56 and object 30 can be varied by lateral movement with respect to one another. In this regard, stage 32 can be moved to affect lateral motion of object 30, or microwave transmission line 50, microwave input 52 and reflective load 54 can be laterally moved as a unit to alter the points of contact to different locations of object 30. In any event, the movable entities can be controlled by a computer based upon a CAD drawing or pattern for the object being printed. Suitable mechanical means for affecting movement and means for computer control will be evident to one having ordinary skill in the art.

Accordingly, in more specific embodiments of the present disclosure, methods for modifying a printed object can include: depositing a printing composition in a layer-by-layer deposition process to form a printed object, placing a microwave transmission line in proximity to the printed object, establishing a standing wave in the microwave transmission line, and after depositing the printing composition to form the printed object, contacting the standing wave with the printed object at one or more locations. The printing composition contains a solidifiable matrix and a plurality of carbon nanostructures dispersed in the solidifiable matrix. The carbon nanostructures include a plurality of carbon nanotubes that are branched, crosslinked, and share common walls with one another. Contacting the standing wave with the printed object at one or more locations heats the carbon nanostructures at the one or more locations and promotes consolidation of the printing composition within the printed object. As discussed above, other microwave absorbers such as metal nanoparticles can be used similarly.

In still other embodiments of the present disclosure, methods for modifying a printed object can include removing at least a portion of the solidifiable matrix therefrom following completion of the printing process. More specifically, such methods can include heating the carbon nanostructures or other microwave absorber at one or more locations until the surrounding matrix decomposes, thereby affecting removal of the matrix and further defining the shape of the object.

In particular, methods for removing a portion of the solidifiable matrix from a printed object can include: providing a three-dimensional printed object, which is formed from a printing composition containing a solidifiable matrix and a microwave absorber dispersed in the solidifiable matrix, and applying a focused input of microwave radiation to the printed object at one or more locations. Applying the focused input of microwave radiation heats the microwave absorber at the one or more locations. Heating of the microwave absorber continues until the solidifiable matrix decomposes at the one or more locations. In more specific embodiments, the microwave absorber can be a plurality of carbon nanostructures dispersed in the solidifiable matrix.

Figure 9:
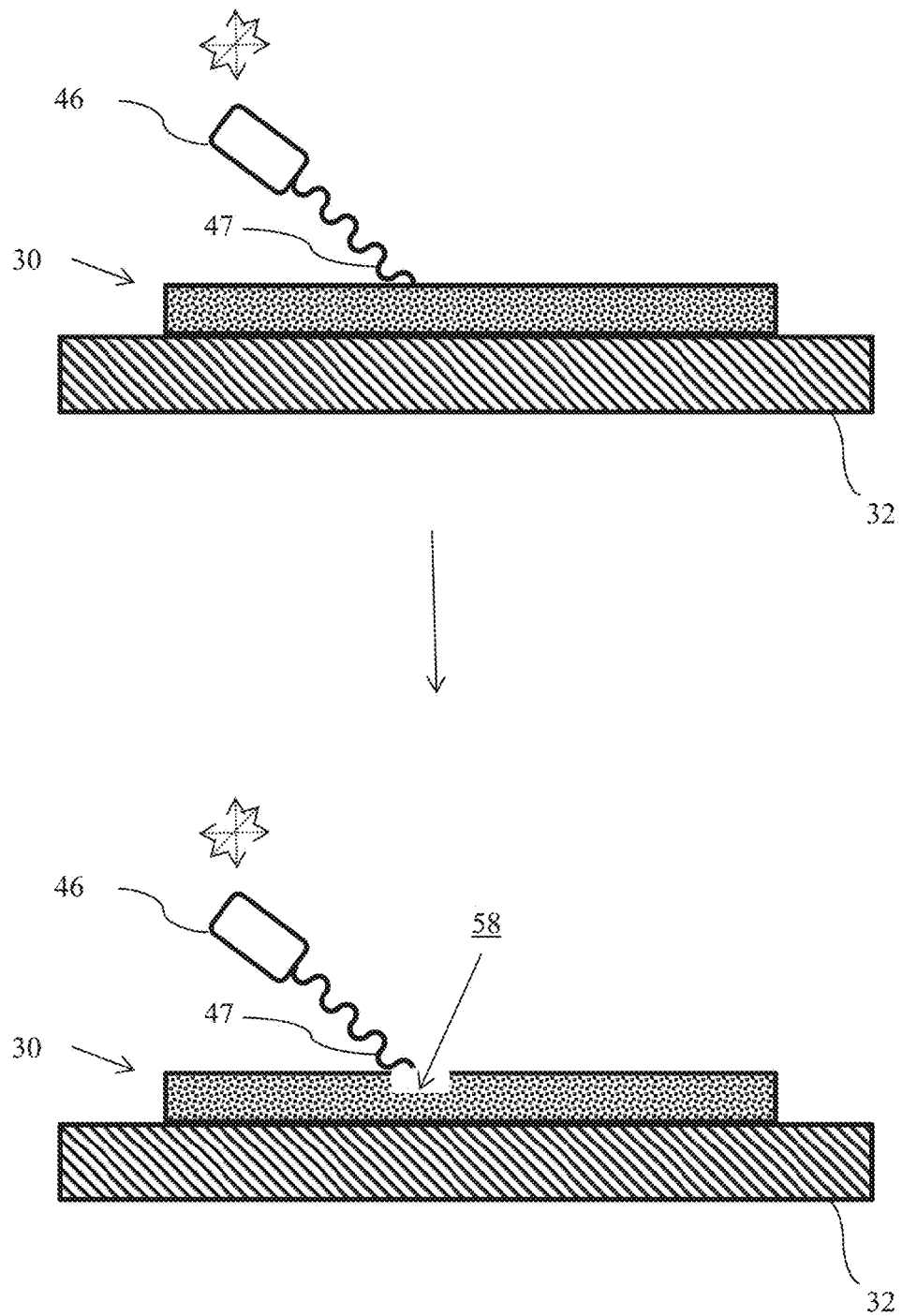
FIG. 9 shows an illustrative schematic demonstrating the removal of a portion of the solidifiable matrix from the exterior of a printed object to define an indention therein.

Heating of a printed object to affect matrix decomposition can take place using any suitable source of microwave radiation, such as the exemplary configurations discussed hereinabove. For example, in an emitter configuration similar to that of FIG. 4, heating of carbon nanostructures or other microwave absorber within the object can remove a portion of the solidifiable matrix from the object's exterior. FIG. 9 shows an illustrative schematic demonstrating the removal of a portion of the solidifiable matrix from the exterior of a printed object to define indention 58 therein.

Figure 10:
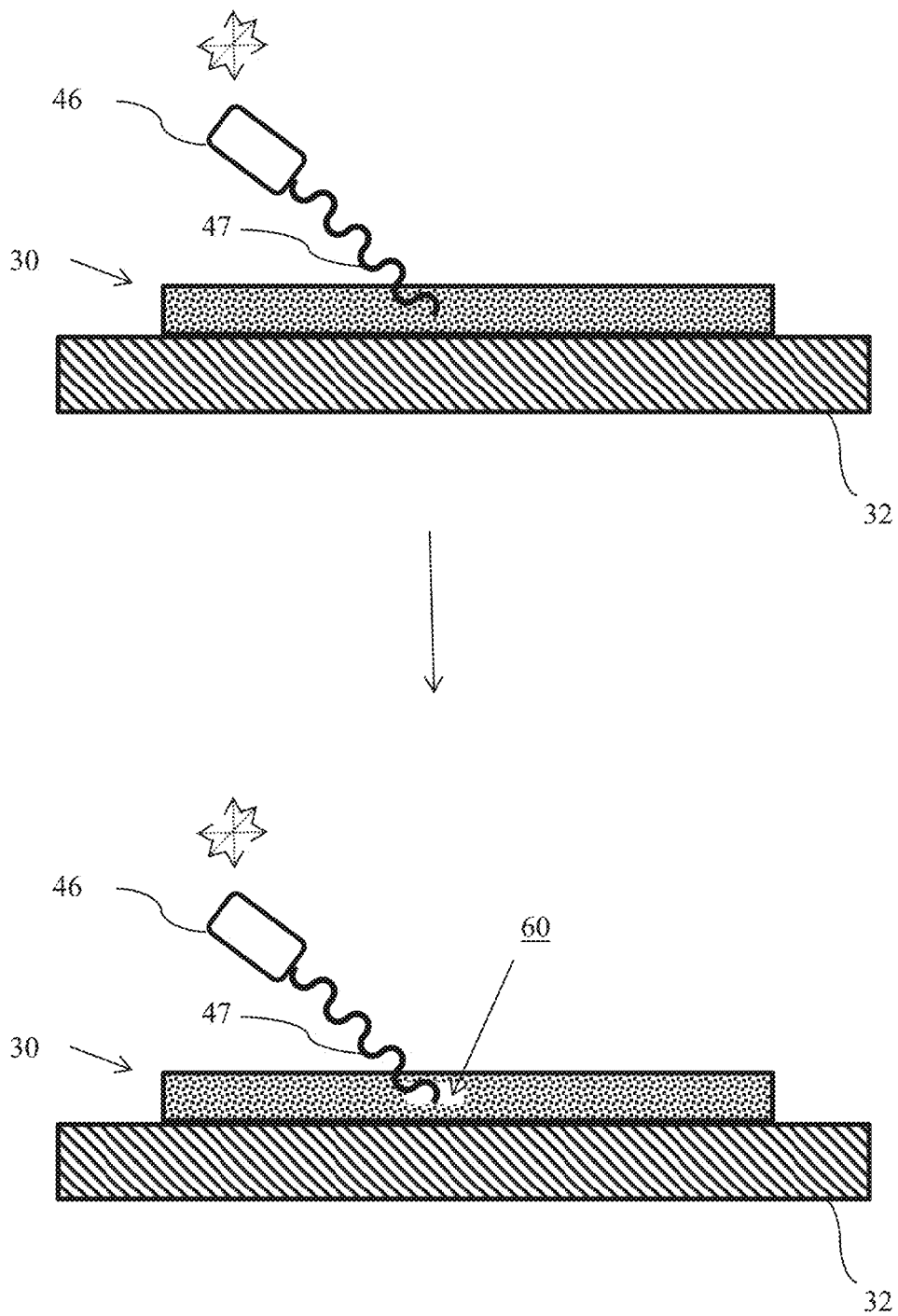
FIG. 10 shows an illustrative schematic demonstrating how removal of a portion of the solidifiable matrix from the interior of a printed object can result in a cavity being defined therein.

In more particular embodiments of the present disclosure, the focused input of microwave radiation can be applied to the interior of the printed object and result in removal of the solidifiable matrix therefrom, as depicted in FIG. 10. Specifically, FIG. 10 shows an illustrative schematic demonstrating how removal of a portion of the solidifiable matrix from the interior of a printed object can result in cavity 60 being defined therein.

In other particular embodiments of the present disclosure, removal of the solidifiable matrix from the interior of a printed object can result in creation of structures that are not otherwise readily defined by three-dimensional printing or other methods of fabrication. For example, decomposition of the solidifiable matrix can be used to define freestanding structures within an otherwise enclosed interior cavity of a printed object.

Figure 11:
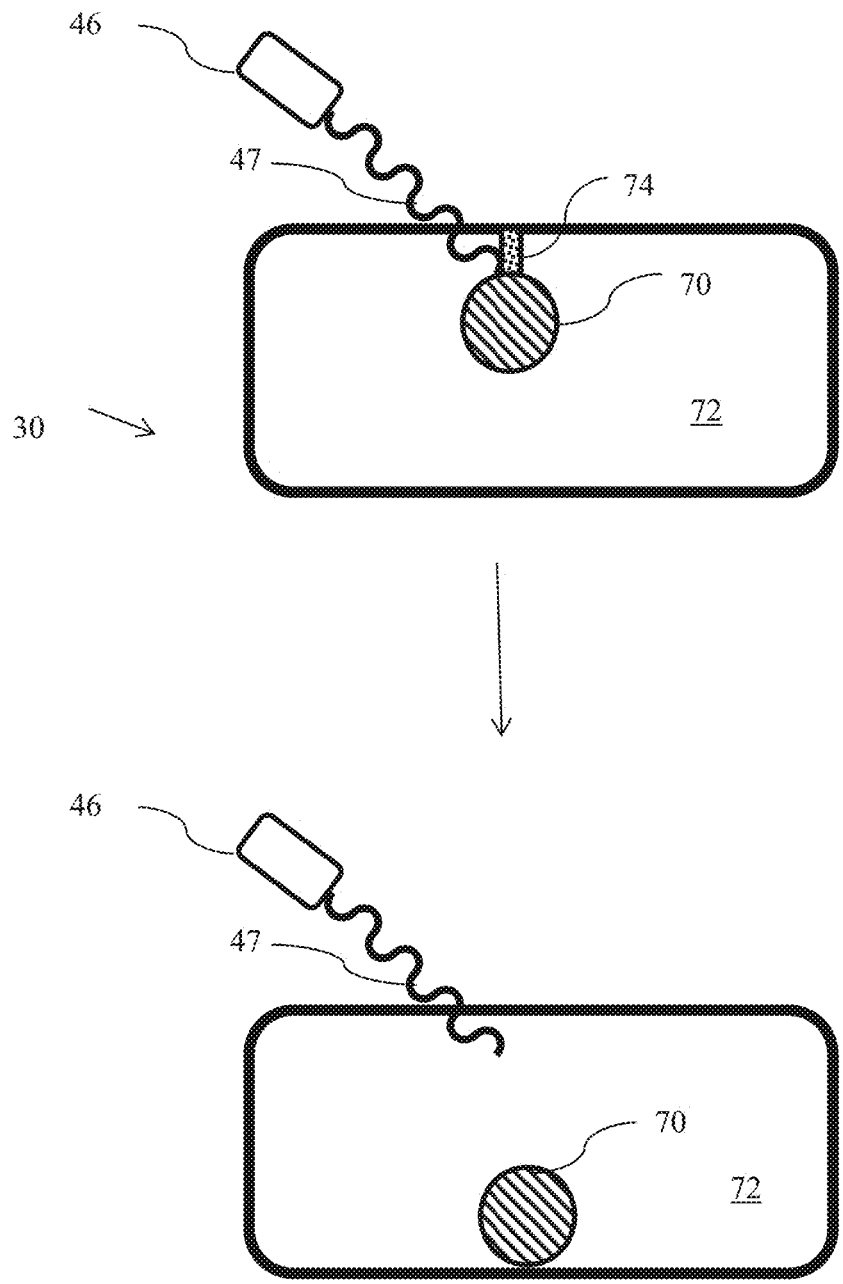
FIG. 11 shows an illustrative schematic demonstrating how a freestanding structure can be defined within a printed object through decomposition of a portion of the solidifiable matrix therein.

FIG. 11 shows an illustrative schematic demonstrating how a freestanding structure can be defined within a printed object through decomposition of a portion of the solidifiable matrix therein. As shown in FIG. 11, as-printed object 30 contains shape 70 defined within cavity 72 therein. Shape 70 is connected to the bulk of object 30 by stem 74. At least stem 74 contains carbon nanostructures or another microwave absorber in order to affect microwave heating thereof. A focused input of microwave radiation is applied to stem 74 in order to affect its heating and eventual decomposition, thereby resulting in release of shape 70, which is then able to freely move about within cavity 72. Although FIG. 11 has depicted shape 70 as having substantially spherical dimensions, it is to be recognized that shape 70 is arbitrary and other structures can be produced similarly according to the disclosure herein. Likewise, removal of the solidifiable matrix need not necessarily result in release of an interior structure in the manner depicted in FIG. 11.

In some embodiments, only stem 74 contains carbon nanostructures or another microwave absorber in order to promote decomposition of the solidifiable matrix therein. In this instance, the input of microwave radiation need not necessarily be focused only upon stem 74, since portions of object 30 lacking the microwave absorber will not undergo effective heating. In other embodiments, however, carbon nanostructures or another microwave absorber can be present in one or more additional locations within object 30, and a focused input of microwave radiation onto stem 74 can be used to affect decomposition of the solidifiable matrix and release of shape 70. Before or after release of shape 70, other locations within object 30 can undergo microwave heating in order to realize the benefits described herein.

In order to provide a more thorough understanding of the present disclosure, exemplary processes for producing carbon nanostructures on a growth substrate and releasing the carbon nanostructures in free form are described in greater detail hereinbelow.

In some embodiments, processes described herein can include preparing a carbon nanostructure on a growth substrate with one or more provisions for removal of the carbon nanostructure once synthesis of the carbon nanostructure is complete. The provision(s) for removing the carbon nanostructure from the growth substrate can include one or more techniques selected from the group consisting of: (i) providing an anti-adhesive coating on the growth substrate, (ii) providing an anti-adhesive coating on a transition metal nanoparticle catalyst employed in synthesizing the carbon nanostructure, (iii) providing a transition metal nanoparticle catalyst with a counter ion that etches the growth substrate, thereby weakening the adherence of the carbon nanostructure to the growth substrate, and (iv) conducting an etching operation after carbon nanostructure synthesis is complete to weaken adherence of the carbon nanostructure to the growth substrate. Combinations of these techniques can also be used. In combination with these techniques, various fluid shearing or mechanical shearing operations can be carried out to affect the removal of the carbon nanostructure from the growth substrate.

In some embodiments, processes disclosed herein can include removing a carbon nanostructure from a growth substrate. In some embodiments, removing a carbon nanostructure from a growth substrate can include using a high pressure liquid or gas to separate the carbon nanostructure from the growth substrate, separating contaminants derived from the growth substrate (e.g., fragmented growth substrate) from the carbon nanostructure, collecting the carbon nanostructure with air or from a liquid medium with the aid of a filter medium, and isolating the carbon nanostructure from the filter medium. In various embodiments, separating contaminants derived from the growth substrate from the carbon nanostructure can take place by a technique selected from the group consisting of cyclone filtering, density separation, size-based separation, and any combination thereof. The foregoing processes are described in more detail hereinbelow.

Figure 12:
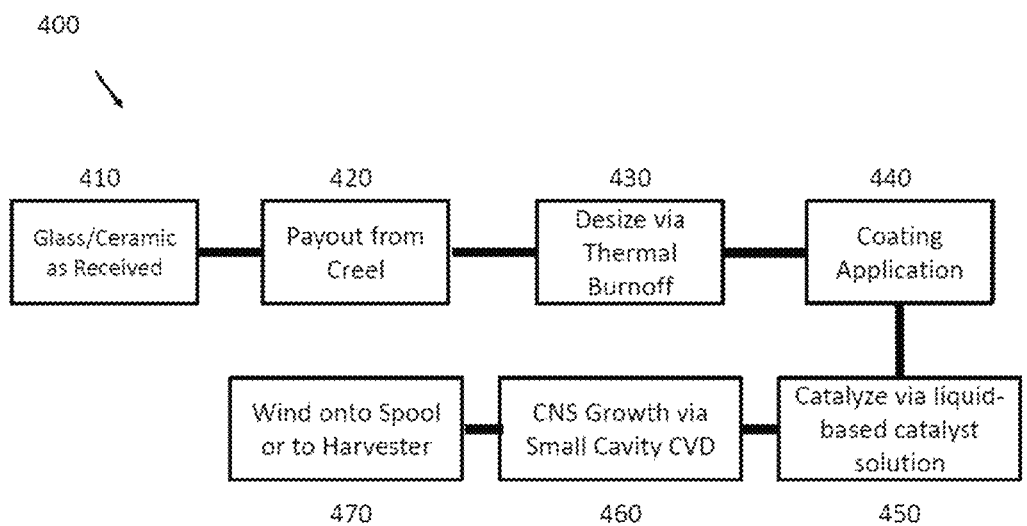
FIG. 12 shows a flow diagram of an illustrative carbon nanostructure growth process which employs an exemplary glass or ceramic growth substrate.

FIG. 12 shows a flow diagram of an illustrative carbon nanostructure growth process 400, which employs an exemplary glass or ceramic growth substrate 410. It is to be understood that the choice of a glass or ceramic growth substrate is merely exemplary, and the substrate can also be metal, an organic polymer (e.g., aramid), basalt fiber, or carbon, for example. In some embodiments, the growth substrate can be a fiber material of spoolable dimensions, thereby allowing formation of the carbon nanostructure to take place continuously on the growth substrate as the growth substrate is conveyed from a first location to a second location. Carbon nanostructure growth process 400 can employ growth substrates in a variety of forms such as fibers, tows, yarns, woven and non-woven fabrics, sheets, tapes, belts and the like. For convenience in continuous syntheses, tows and yarns are particularly convenient fiber materials.

Referring still to FIG. 12, such a fiber material can be meted out from a payout creel at operation 420 and delivered to an optional desizing station at operation 430. Desizing is ordinarily conducted when preparing carbon nanostructure-infused fiber materials in order to increase the degree of infusion of the carbon nanostructure to the fiber material. However, when preparing an isolated carbon nanostructure, desizing operation 430 can be skipped, for example, if the sizing promotes a decreased degree of adhesion of the transition metal nanoparticle catalyst and/or carbon nanostructure to the growth substrate, thereby facilitating removal of the carbon nanostructure. Numerous sizing compositions associated with fiber substrates can contain binders and coupling agents that primarily provide anti-abrasive effects, but typically do not exhibit exceptional adhesion to fiber surface. Thus, forming a carbon nanostructure on a growth substrate in the presence of a sizing can actually promote subsequent isolation of the carbon nanostructure in some embodiments. For this reason, it can be beneficial to skip desizing operation 430, in some embodiments.

In some embodiments, an additional coating application can take place at operation 440. Additional coatings that can be applied in operation 440 include, for example, colloidal ceramics, glass, silanes, or siloxanes that can decrease catalyst and/or carbon nanostructure adhesion to the growth substrate. In some embodiments, the combination of a sizing and the additional coating can provide an anti-adhesive coating that can promote removal of the carbon nanostructure from the growth substrate. In some embodiments, the sizing alone can provide sufficient anti-adhesive properties to facilitate carbon nanostructure removal from the growth substrate, as discussed above. In some embodiments, the additional coating provided in operation 440 alone can provide sufficient anti-adhesive properties to facilitate carbon nanostructure removal from the growth substrate. In still further embodiments, neither the sizing nor the additional coating, either alone or in combination, provides sufficient anti-adhesive properties to facilitate carbon nanostructure removal. In such embodiments, decreased adhesion of the carbon nanostructure to the growth substrate can be attained by judicious choice of the transition metal nanoparticles used to promote growth of the carbon nanostructure on the growth substrate. Specifically, in some such embodiments, operation 450 can employ a catalyst that is specifically chosen for its poor adhesive characteristics.

Referring still to FIG. 12, after optional desizing operation 430 and optional coating operation 440, catalyst is applied to the growth substrate in operation 450, and carbon nanostructure growth is affected through a small cavity CVD process in operation 460. The resulting carbon nanostructure-infused growth substrate (i.e., a carbon nanostructure-infused fiber material) can be wound for storage and subsequent carbon nanostructure removal or immediately taken into a carbon nanostructure isolation process employing a harvester, as indicated in operation 470.

In some embodiments, the growth substrate can be modified to promote removal of a carbon nanostructure therefrom. In some embodiments, the growth substrate used for producing a carbon nanostructure can be modified to include an anti-adhesive coating that limits adherence of the carbon nanostructure to the growth substrate. The anti-adhesive coating can include a sizing that is commercially applied to the growth substrate, or the anti-adhesive coating can be applied after receipt of the growth substrate. In some embodiments, a sizing can be removed from the growth substrate prior to applying an anti-adhesive coating. In other embodiments, a sizing can be applied to a growth substrate in which a sizing is present.

In some embodiments, the carbon nanostructure can be grown on the growth substrate from a catalyst that includes a plurality of transition metal nanoparticles, as generally described hereinbelow. In some embodiments, one mode for catalyst application onto the growth substrate can be through particle adsorption, such as through direct catalyst application using a liquid or colloidal precursor-based deposition. Suitable transition metal nanoparticle catalysts can include any d-block transition metal or d-block transition metal salt. In some embodiments, a transition metal salt can be applied to the growth substrate without thermal treatments. In other embodiments, a transition metal salt can be converted into a zero-valent transition metal on the growth substrate through a thermal treatment.

Figure 13:
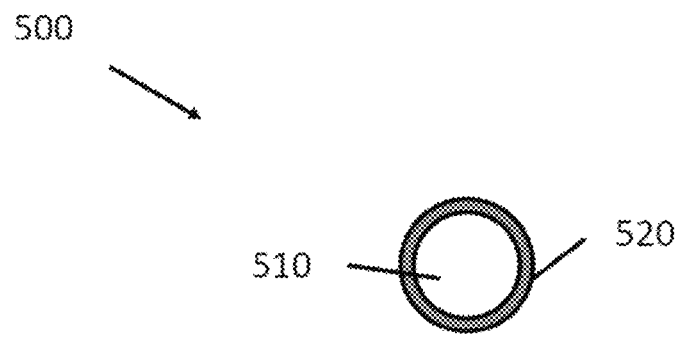
FIG. 13 shows an illustrative schematic of a transition metal nanoparticle coated with an anti-adhesive layer.

In some embodiments, the transition metal nanoparticles can be coated with an anti-adhesive coating that limits their adherence to the growth substrate. As discussed above, coating the transition metal nanoparticles with an anti-adhesive coating can also promote removal of the carbon nanostructure from the growth substrate following synthesis of the carbon nanostructure. Anti-adhesive coatings suitable for use in conjunction with coating the transition metal nanoparticles can include the same anti-adhesive coatings used for coating the growth substrate. FIG. 13 shows an illustrative schematic of a transition metal nanoparticle coated with an anti-adhesive layer. As shown in FIG. 13, coated catalyst 500 can include core catalyst particle 510 overcoated with anti-adhesive layer 520. In some embodiments, colloidal nanoparticle solutions can be used in which an exterior layer about the nanoparticle promotes growth substrate to nanoparticle adhesion but discourages carbon nanostructure to nanoparticle adhesion, thereby limiting adherence of the carbon nanostructure to the growth substrate.

Figure 14:
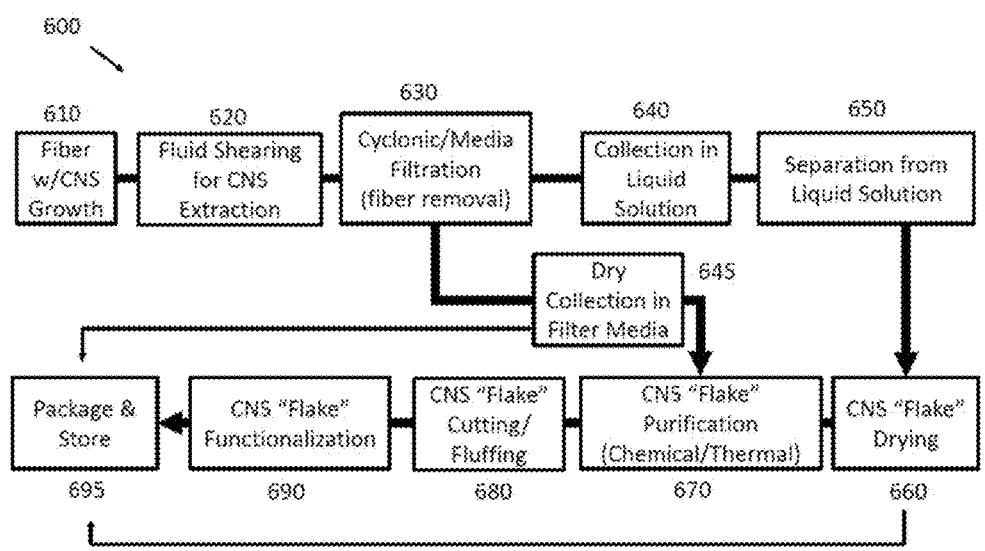
FIG. 14 shows a flow diagram of an illustrative process for isolating a carbon nanostructure from a growth substrate.

FIG. 14 shows a flow diagram of an illustrative process for isolating a carbon nanostructure from a growth substrate. As shown in FIG. 14, process 600 begins with a carbon nanostructure-infused fiber being provided in operation 610. Non-fibrous growth substrates onto which a carbon nanostructure has been grown can be used in a like manner. Fluid shearing can be conducted at operation 620 using a gas or a liquid in order to accomplish removal of the carbon nanostructure from the fiber material. In some cases, fluid shearing can result in at least a portion of the fiber material being liberated from the bulk fiber and incorporated with the free carbon nanostructure, while not being adhered thereto. If needed, in operation 630, the liberated carbon nanostructure can be subjected to cyclonic/media filtration in order to remove the non-adhered fiber material fragments. Density-based or size-based separation techniques can also be used to bring about separation of the carbon nanostructure from the non-adhered fiber material. In the case of gas shearing, the carbon nanostructure can be collected in dry form on a filter medium in operation 645. The resultant dry flake material collected in operation 645 can be subjected to any optional further chemical or thermal purification, as outlined further in FIG. 14. In the case of liquid shearing, the liquid can be collected in operation 640, and separation of the carbon nanostructure from the liquid can take place in operation 650, ultimately producing a dry flake material in operation 660. The carbon nanostructure flake material isolated in operation 660 can be similar to that produced in operation 645. After isolating the carbon nanostructure flake material in operation 660, it can be ready for packaging and/or storage in operation 695. In processes employing gas shearing to remove the carbon nanostructure, the carbon nanostructure can be dry collected in a filter at operation 645. Prior to packaging and/or storage in operation 695, the crude product formed by either shearing technique can undergo optional chemical and/or thermal purification in operation 670. These purification processes can be similar to those conducted when purifying traditional carbon nanotubes. By way of example, purification conducted in operation 670 can involve removal of a catalyst used to affect carbon nanostructure growth, such as, for example, through treatment with liquid bromine. Other purification techniques can be envisioned by one having ordinary skill in the art.

Referring still to FIG. 14, the carbon nanostructure produced by either shearing technique can undergo further processing by cutting or fluffing in operation 680. Such cutting and fluffing can involve mechanical ball milling, grinding, blending, chemical processes, or any combination thereof. Further optionally, in operation 690, the carbon nanostructure can be further functionalized using any technique in which carbon nanotubes are normally modified or functionalized. Suitable functionalization techniques in operation 690 can include, for example, plasma processing, chemical etching, and the like. Functionalization of the carbon nanostructure in this manner can produce chemical functional group handles that can be used for further modifications. For example, in some embodiments, a chemical etch can be employed to form carboxylic acid groups on the carbon nanostructure that can be used to bring about covalent attachment to any number of further entities including, for example, the matrix material of a composite material. In this regard, a functionalized carbon nanostructure can provide a superior reinforcement material in a composite matrix, since it can provide multiple sites for covalent attachment to the composite's matrix material in all dimensions.

In addition to facilitating the covalent attachment of a carbon nanostructure to the matrix of a composite material, functionalization of a carbon nanostructure can also allow other groups to be covalently attached to the carbon nanostructure. In some embodiments, access to other covalently linked entities such as synthetic or biopolymers can be realized via functional group handles produced in post-processing carbon nanostructure functionalization. For example, a carbon nanostructure can be linked to polyethylene glycol (e.g., through ester bonds formed from carboxylic acid groups on the carbon nanostructure) to provide a PEGylated carbon nanostructure, which can confer improved water solubility to the carbon nanostructure. In some embodiments, the carbon nanostructure can provide a platform for covalent attachment to biomolecules to facilitate biosensor manufacture. In this regard, the carbon nanostructure can provide improved electrical percolation pathways for enhanced detection sensitivity relative to other carbon nanotube-based biosensors employing individualized carbon nanotubes or even conventional carbon nanotube forests. Biomolecules of interest for sensor development can include, for example, peptides, proteins, enzymes, carbohydrates, glycoproteins, DNA, RNA, and the like.

Figure 15:
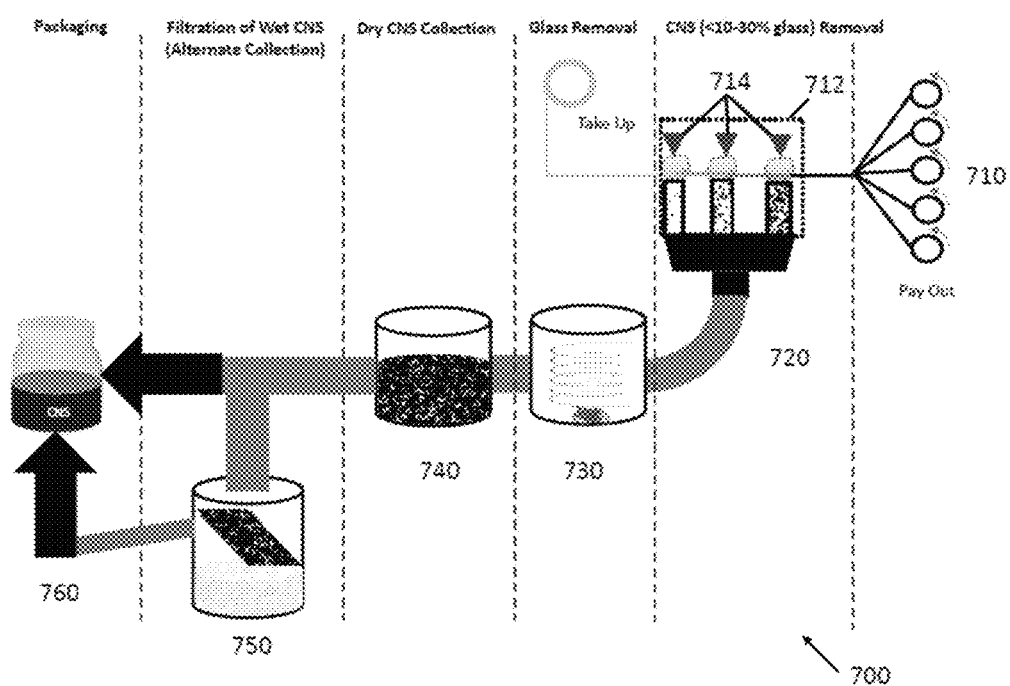
FIG. 15 shows an illustrative schematic further elaborating on the process demonstrated in FIG. 14.

FIG. 15 shows an illustrative schematic further elaborating on the process demonstrated in FIG. 14. As illustrated in process 700 of FIG. 15, a single spool or multiple spools of a carbon nanostructure-laden fiber-type substrate is fed in operation 710 to removal chamber 712 using a pay-out and take-up system. Removal of the carbon nanostructure from the fiber-type substrate can be affected with a single or several pressurized air source tools 714, such as an air knife or air nozzle at operation 720. Such air source tools can be placed generally perpendicular to the spool(s), and the air can then be directed on to the fiber-type substrate carrying the carbon nanostructure. In some embodiments, the air source tool can be stationary, while in other embodiments, the air source tool can be movable. In embodiments where the air source tool is movable, it can be configured to oscillate with respect to the surface of the fiber-type substrate to improve the removal efficiency. Upon air impact, fiber tows and other bundled fiber-type substrates can be spread, thereby exposing additional surface area on the substrate and improving removal of the carbon nanostructure, while advantageously avoiding mechanical contact. In some embodiments, the integrity of the substrate can be sufficient to recycle the substrate in a continuous cycle of carbon nanostructure synthesis and removal. Thus, in some embodiments, the substrate can be in the form of a belt or a loop in which a carbon nanostructure is synthesized on the substrate, subsequently removed downstream, and then recycled for additional growth of a new carbon nanostructure in the location where the original carbon nanostructure was removed. In some embodiments, removal of the original carbon nanostructure can result in removal of the surface treatment that facilitated carbon nanostructure removal. Thus, in some embodiments, the substrate can again be modified after removal of the original carbon nanostructure to promote removal of the new carbon nanostructure, as generally performed according to the surface modification techniques described herein. The surface treatment performed on the substrate after the original carbon nanostructure is removed can be the same or different as the original surface treatment.

In some embodiments, the integrity of the substrate can be compromised during carbon nanostructure removal, and at least a portion of the substrate can become admixed with the carbon nanostructure while no longer being adhered thereto. Referring still to FIG. 15, fragmented substrate that has become admixed with the isolated carbon nanostructure can be removed in operation 730. In FIG. 15, operation 730 is depicted as taking place by cyclonic filtration, but any suitable solids separation technique can be used. For example, in some embodiments, sieving, differential settling, or other size-based separations can be performed. In other embodiments, density-based separations can be performed. In still other embodiments, a chemical reaction may be used, at least in part, to affect separation of the carbon nanostructure from growth substrate that is not adhered to the carbon nanostructure. Although FIG. 15 has depicted a single cyclonic filtration, multiple vacuum and cyclonic filtration techniques can be used in series, parallel, or any combination thereof to remove residual fragmented growth substrate from the carbon nanostructure. Such techniques can employ multiple stages of filter media and/or filtration rates to selectively capture the fragmented growth substrate while allowing the carbon nanostructure to pass to a collection vessel. The resultant carbon nanostructure can be either collected dry at operation 740 or collected as a wet sludge at operation 750. In some embodiments, the carbon nanostructure can be processed directly following the removal of fragmented growth substrate in operation 730 and packed into a storage vessel or shippable container in packaging operation 760. Otherwise, packaging can follow dry collection operation 740 or wet collection operation 750.

In embodiments where wet processing is employed, the carbon nanostructure can be mixed with about 1% to about 40% solvent in water and passed through a filter or like separation mechanism to separate the carbon nanostructure from the solvent. The resultant separated carbon nanostructure can be dried and packed or stored "wet" as a dispersion in a fluid phase. It has been observed that unlike individualized carbon nanotube solutions or dispersions, carbon nanostructures can advantageously form stable dispersions. In some embodiments, stable dispersions can be achieved in the absence of stabilizing surfactants, even with water as solvent. In some or other embodiments, a solvent can be used in combination with water during wet processing. Suitable solvents for use in conjunction with wet processing can include, but are not limited to, isopropanol (IPA), ethanol, methanol, and water.

Figure 16:
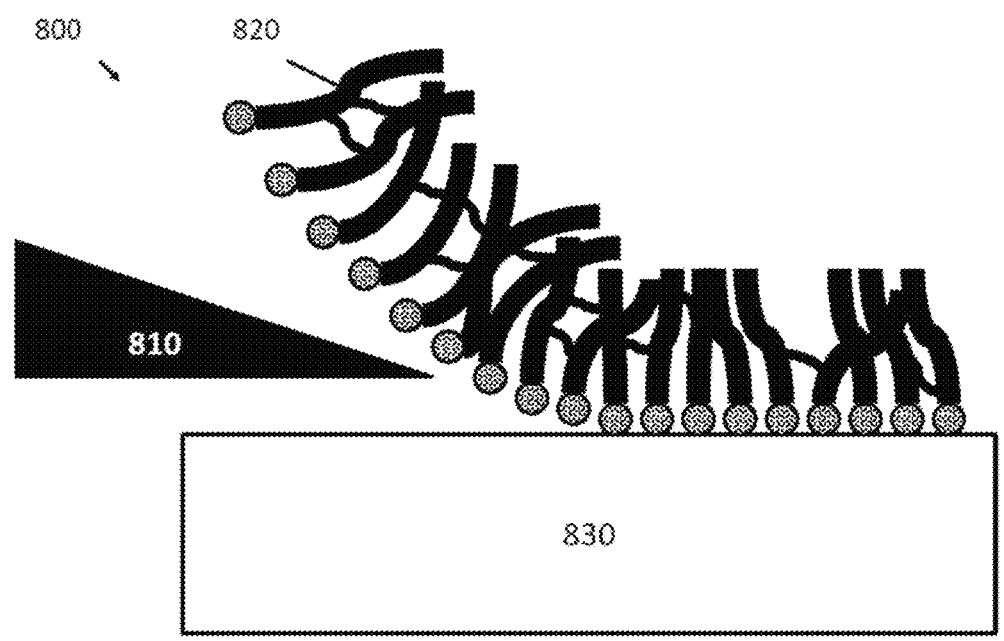
FIG. 16 shows an illustrative schematic demonstrating how mechanical shearing can be used to remove a carbon nanostructure and a transition metal nanoparticle catalyst from a growth substrate.

As an alternative to fluid shearing, mechanical shearing can be used to remove the carbon nanostructure from the growth substrate in some embodiments. FIG. 16 shows an illustrative schematic demonstrating how mechanical shearing can be used to remove a carbon nanostructure and a transition metal nanoparticle catalyst from a growth substrate. As shown in FIG. 16, carbon nanostructure removal process 800 can employ mechanical shearing force 810 to remove both the carbon nanostructure and the transition metal nanoparticle catalyst from growth substrate 830 as monolithic entity 820. In some such embodiments, sizing and/or additional anti-adhesive coatings can be employed to limit carbon nanostructure and/or nanoparticle adhesion to the growth substrate, thereby allowing mechanical shear or another type of shearing force to facilitate removal of the carbon nanostructure from the growth substrate. In some embodiments, mechanical shear can be provided by grinding the carbon nanostructure-infused fiber with dry ice.

As another alternative to fluid shearing, in some embodiments, sonication can be used to remove the carbon nanostructure from the growth substrate.

Figure 17:
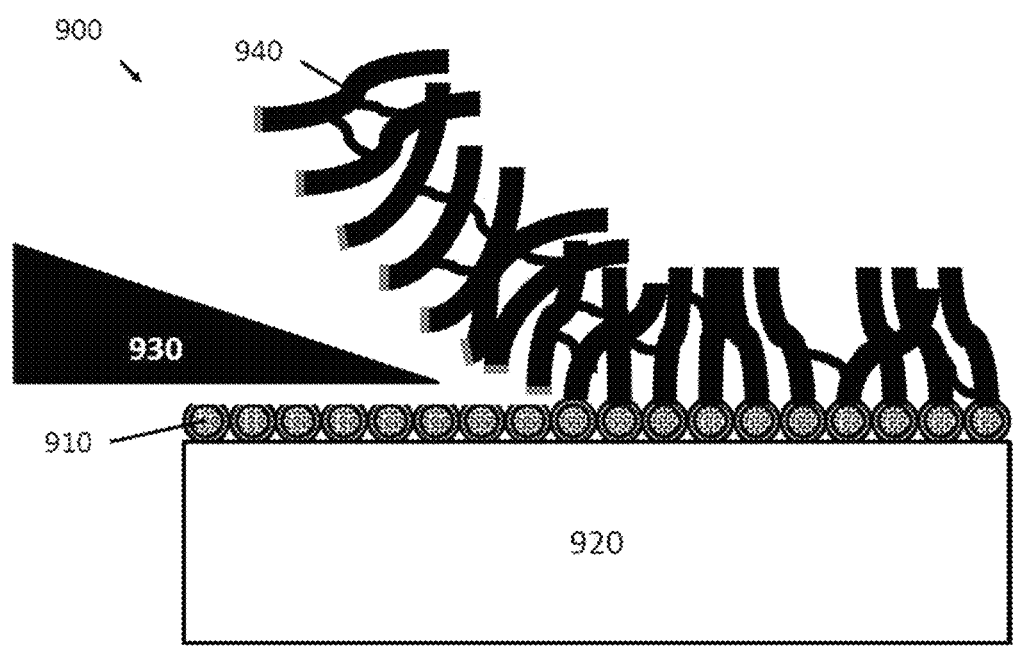
FIG. 17 shows an illustrative schematic demonstrating a carbon nanostructure removal process in which a carbon nanostructure can be isolated from a growth substrate absent a transition metal nanoparticle catalyst.

In some embodiments, the carbon nanostructure can be removed from the growth substrate without substantially removing the transition metal nanoparticle catalyst. FIG. 17 shows an illustrative schematic demonstrating carbon nanostructure removal process 900 in which a carbon nanostructure can be isolated from a growth substrate absent a transition metal nanoparticle catalyst. As shown in FIG. 17, carbon nanostructure 940 can be grown on growth substrate 920 using implanted transition metal nanoparticle catalyst 910. Thereafter, shear removal 930 of carbon nanostructure 940 leaves transition metal nanoparticle catalyst 910 behind on growth substrate 920. In some such embodiments, a layered catalyst can promote adhesion to the substrate surface, while decreasing carbon nanostructure to nanoparticle adhesion.

Although FIGS. 16 and 17 have depicted carbon nanostructure growth as taking place with basal growth from the catalyst, the skilled artisan will recognize that other mechanistic forms of carbon nanostructure growth are possible. For example, carbon nanostructure growth can also take place such that the catalyst resides distal to the growth substrate on the surface of the carbon nanostructure (i.e., tip growth) or somewhere between tip growth and basal growth. In some embodiments, predominantly basal growth can be selected to aid in carbon nanostructure removal from the growth substrate.

In alternative embodiments, removal of the carbon nanostructure from the growth substrate can take place by a process other than fluid shearing or mechanical shearing. In some embodiments, chemical etching can be used to remove the carbon nanostructure from the growth substrate. In some embodiments, the transition metal nanoparticle catalyst used to promote carbon nanostructure growth can be a transition metal salt containing an anion that is selected to etch the growth substrate, thereby facilitating removal of the carbon nanostructure. Suitable etching anions can include, for example, chlorides, sulfates, nitrates, nitrites, and fluorides. In some or other embodiments, a chemical etch can be employed independently from the catalyst choice. For example, when employing a glass substrate, a hydrogen fluoride etch can be used to weaken adherence of the carbon nanostructure and/or the transition metal nanoparticle catalyst to the substrate.

The carbon nanostructures disclosed herein comprise carbon nanotubes (CNTs) in a network having a complex structural morphology, which has been described in more detail hereinabove. Without being bound by any theory or mechanism, it is believed that this complex structural morphology results from the preparation of the carbon nanostructure on a substrate under CNT growth conditions that produce a rapid growth rate on the order of several microns per second. The rapid CNT growth rate, coupled with the close proximity of the CNTs to one another, can confer the observed branching, crosslinking, and shared wall motifs to the CNTs. In the discussion that follows, techniques for producing a carbon nanostructure bound to a fiber substrate are described. For simplicity, the discussion may refer to the carbon nanostructure disposed on the substrate interchangeably as CNTs, since CNTs represent the major structural component of carbon nanostructures.

In some embodiments, the processes disclosed herein can be applied to nascent fiber materials generated de novo before, or in lieu of, application of a typical sizing solution to the fiber material. Alternatively, the processes disclosed herein can utilize a commercial fiber material, for example, a tow, that already has a sizing applied to its surface. In such embodiments, the sizing can be removed to provide a direct interface between the fiber material and the synthesized carbon nanostructure, although a transition metal nanoparticle catalyst can serve as an intermediate linker between the two. After carbon nanostructure synthesis, further sizing agents can be applied to the fiber material as desired. For the purpose of carbon nanostructure isolation, any of the above mentioned sizing or coatings can be employed to facilitate the isolation process. Equally suitable substrates for forming a carbon nanostructure include tapes, sheets and even three dimensional forms which can be used to provide a shaped carbon nanostructure product. The processes described herein allow for the continuous production of CNTs that make up the carbon nanostructure network having uniform length and distribution along spoolable lengths of tow, tapes, fabrics and other 3D woven structures.

As used herein the term "fiber material" refers to any material which has fiber as its elementary structural component. The term encompasses fibers, filaments, yarns, tows, tows, tapes, woven and non-woven fabrics, plies, mats, and the like.

As used herein the term "spoolable dimensions" refers to fiber materials having at least one dimension that is not limited in length, allowing for the material to be stored on a spool or mandrel. Processes of described herein can operate readily with 5 to 20 lb. spools, although larger spools are usable. Moreover, a pre-process operation can be incorporated that divides very large spoolable lengths, for example 100 lb. or more, into easy to handle dimensions, such as two 50 lb. spools As used herein, the term "carbon nanotube" (CNT, plural CNTs) refers to any of a number of cylindrically-shaped allotropes of carbon of the fullerene family including single-walled carbon nanotubes (SWNTs), double-walled carbon nanotubes (DWNTs), multi-walled carbon nanotubes (MWNTs). CNTs can be capped by a fullerene-like structure or open-ended. CNTs include those that encapsulate other materials. CNTs can appear in branched networks, entangled networks, and combinations thereof. The CNTs prepared on the substrate within the carbon nanostructure can include individual CNT motifs from exclusive MWNTs, SWNTs, or DWNTs, or the carbon nanostructure can include mixtures of CNT these motifs.

As used herein "uniform in length" refers to an average length of CNTs grown in a reactor for producing a carbon nanostructure. "Uniform length" means that the CNTs have lengths with tolerances of plus or minus about 20% of the total CNT length or less, for CNT lengths varying from between about 1 micron to about 500 microns. At very short lengths, such as 1-4 microns, this error may be in a range from between about plus or minus 20% of the total CNT length up to about plus or minus 1 micron, that is, somewhat more than about 20% of the total CNT length. In the context of the carbon nanostructure, at least one dimension of the carbon nanostructure can be controlled by the length of the CNTs grown.

As used herein "uniform in distribution" refers to the consistency of density of CNTs on a growth substrate, such as a fiber material. "Uniform distribution" means that the CNTs have a density on the fiber material with tolerances of plus or minus about 10% coverage defined as the percentage of the surface area of the fiber covered by CNTs. This is equivalent to $\pm 1500$ CNTs/$\mu m^2$ for an 8 nm diameter CNT with 5 walls. Such a figure assumes the space inside the CNTs as fillable.

As used herein, the term "transition metal" refers to any element or alloy of elements in the d-block of the periodic table. The term "transition metal" also includes salt forms of the base transition metal element such as oxides, carbides, nitrides, and the like.

As used herein, the term "sizing agent," "fiber sizing agent," or just "sizing," refers collectively to materials used in the manufacture of fibers as a coating to protect the integrity of fibers, provide enhanced interfacial interactions between a fiber and a matrix material in a composite, and/or alter and/or enhance particular physical properties of a fiber.

As used herein, the term "material residence time" refers to the amount of time a discrete point along a fiber material of spoolable dimensions is exposed to CNT growth conditions during the CNS processes described herein. This definition includes the residence time when employing multiple CNT growth chambers.

As used herein, the term "linespeed" refers to the speed at which a fiber material of spoolable dimensions is fed through the CNT synthesis processes described herein, where linespeed is a velocity determined by dividing CNT chamber(s)' length by the material residence time.

In some embodiments, the CNT-laden fiber material includes a fiber material of spoolable dimensions and carbon nanotubes (CNTs) in the form of a carbon nanostructure grown on the fiber material.

Without being bound by any theory or mechanism, transition metal NPs, which serve as a CNT-forming catalyst, can catalyze CNT growth by forming a CNT growth seed structure. In one embodiment, the CNT-forming catalyst can remain at the base of the fiber material (i.e., basal growth). In such a case, the seed structure initially formed by the transition metal nanoparticle catalyst is sufficient for continued non-catalyzed seeded CNT growth without allowing the catalyst to move along the leading edge of CNT growth (i.e., tip growth). In such a case, the NP serves as a point of attachment for the CNS to the fiber material.

Compositions having CNS-laden fiber materials are provided in which the CNTs are substantially uniform in length. In the continuous process described herein, the residence time of the fiber material in a CNT growth chamber can be modulated to control CNT growth and ultimately, CNT and CNS length. These features provide a means to control specific properties of the CNTs grown and hence the properties of the CNS. CNT length can also be controlled through modulation of the carbon feedstock and carrier gas flow rates and reaction temperature. Additional control of the CNT properties can be obtained by modulating, for example, the size of the catalyst used to prepare the CNTs. For example, 1 nm transition metal nanoparticle catalysts can be used to provide SWNTs in particular. Larger catalysts can be used to prepare predominantly MWNTs.

Additionally, the CNT growth processes employed are useful for providing a CNS-laden fiber material with uniformly distributed CNTs while avoiding bundling and/or aggregation of the CNTs that can occur in processes in which pre-formed CNTs are suspended or dispersed in a solvent medium and applied by hand to the fiber material. In some embodiments, the maximum distribution density, expressed as percent coverage, that is, the surface area of fiber material that is covered, can be as high as about 55% assuming about 8 nm diameter CNTs with 5 walls. This coverage is calculated by considering the space inside the CNTs as being "fillable" space. Various distribution/density values can be achieved by varying catalyst dispersion on the surface as well as controlling gas composition and process speed. Typically for a given set of parameters, a percent coverage within about 10% can be achieved across a fiber surface. Higher density and shorter CNTs (e.g., less than about 100 microns in length) can be useful for improving mechanical properties, while longer CNTs (e.g., greater than about 100 microns in length) with lower density can be useful for improving thermal and electrical properties, although increased density still can be favorable. A lower density can result when longer CNTs are grown. This can be the result of the higher temperatures and more rapid growth causing lower catalyst particle yields.

CNS-laden fiber materials can include a fiber material such as filaments, a fiber yarn, a fiber tow, a fiber-braid, a woven fabric, a non-woven fiber mat, a fiber ply, and other 3D woven structures. Filaments include high aspect ratio fibers having diameters ranging in size from between about 1 micron to about 100 microns. Fiber tows are generally compactly associated bundles of filaments and are usually twisted together to give yarns.

Yarns include closely associated bundles of twisted filaments. Each filament diameter in a yarn is relatively uniform. Yarns have varying weights described by their 'tex,' expressed as weight in grams of 1000 linear meters, or denier, expressed as weight in pounds of 10,000 yards, with a typical tex range usually being between about 200 tex to about 2000 tex.

Tows include loosely associated bundles of untwisted filaments. As in yarns, filament diameter in a tow is generally uniform. Tows also have varying weights and the tex range is usually between 200 tex and 2000 tex. They are frequently characterized by the number of thousands of filaments in the tow, for example 12K tow, 24K tow, 48K tow, and the like.

Tapes are materials that can be assembled as weaves or can represent non-woven flattened tows. Tapes can vary in width and are generally two-sided structures similar to ribbon. CNT infusion can take place on one or both sides of a tape. CNS-laden tapes can resemble a "carpet" or "forest" on a flat substrate surface. However, the CNS can be readily distinguished from conventional aligned CNT forests due to the significantly higher degree of branching and crosslinking that occurs in the CNS structural morphology. Again, processes described herein can be performed in a continuous mode to functionalize spools of tape.

Fiber braids represent rope-like structures of densely packed fibers. Such structures can be assembled from yarns, for example. Braided structures can include a hollow portion or a braided structure can be assembled about another core material.

CNTs lend their characteristic properties such as mechanical strength, low to moderate electrical resistivity, high thermal conductivity, and the like to the CNS-laden fiber material. For example, in some embodiments, the electrical resistivity of a carbon nanotube-laden fiber material is lower than the electrical resistivity of a parent fiber material. Likewise, such properties can translate to the isolated CNS. More generally, the extent to which the resulting CNS-laden fiber expresses these characteristics can be a function of the extent and density of coverage of the fiber by the carbon nanotubes. Any amount of the fiber surface area, from 0-55% of the fiber can be covered assuming an 8 nm diameter, 5-walled MWNT (again this calculation counts the space inside the CNTs as fillable). This number is lower for smaller diameter CNTs and more for greater diameter CNTs. 55% surface area coverage is equivalent to about 15,000 CNTs/micron$^2$. Further CNT properties can be imparted to the fiber material in a manner dependent on CNT length, as described above. CNTs within the carbon nanostructure can vary in length from between about 1 micron to about 500 microns, including about 1 micron, about 2 microns, about 3 microns, about 4 micron, about 5, microns, about 6, microns, about 7 microns, about 8 microns about 9 microns, about 10 microns, about 15 microns, about 20 microns, about 25 microns, about 30 microns, about 35 microns, about 40 microns, about 45 microns, about 50 microns, about 60 microns, about 70 microns, about 80 microns, about 90 microns, about 100 microns, about 150 microns, about 200 microns, about 250 microns, about 300 microns, about 350 microns, about 400 microns, about 450 microns, about 500 microns, and all values and sub-ranges in between. CNTs can also be less than about 1 micron in length, including about 0.5 microns, for example. CNTs can also be greater than 500 microns, including for example, about 510 microns, about 520 microns, about 550 microns, about 600 microns, about 700 microns and all values and subranges in between. It will be understood that such lengths accommodate the presence of crosslinking and branching and therefore the length may be the composite length measured from the base of the growth substrate up to the edges of the CNS.

CNSs described herein can also incorporate CNTs have a length from about 1 micron to about 10 microns. Such CNT lengths can be useful in application to increase shear strength. CNTs can also have a length from about 5 to about 70 microns. Such CNT lengths can be useful in applications for increased tensile strength if the CNTs are aligned in the fiber direction. CNTs can also have a length from about 10 microns to about 100 microns. Such CNT lengths can be useful to increase electrical/thermal properties as well as mechanical properties. CNTs having a length from about 100 microns to about 500 microns can also be beneficial to increase electrical and thermal properties. Such control of CNT length is readily achieved through modulation of carbon feedstock and inert gas flow rates coupled with varying linespeeds and growth temperatures.

In some embodiments, compositions that include spoolable lengths of CNS-laden fiber materials can have various uniform regions with different lengths of CNTs. For example, it can be desirable to have a first portion of CNS-laden fiber material with uniformly shorter CNT lengths to enhance shear strength properties, and a second portion of the same spoolable material with a uniform longer CNT length to enhance electrical or thermal properties.

Processes for rapid CNS growth on fiber materials allow for control of the CNT lengths with uniformity in continuous processes with spoolable fiber materials. With material residence times between 5 to 300 seconds, linespeeds in a continuous process for a system that is 3 feet long can be in a range anywhere from about 0.5 ft/min to about 36 ft/min and greater. The speed selected depends on various parameters as explained further below.

In some embodiments, a material residence time of about 5 seconds to about 30 seconds can produce CNTs having a length between about 1 micron to about 10 microns. In some embodiments, a material residence time of about 30 seconds to about 180 seconds can produce CNTs having a length between about 10 microns to about 100 microns. In still further embodiments, a material residence time of about 180 seconds to about 300 seconds can produce CNTs having a length between about 100 microns to about 500 microns. One skilled in the art will recognize that these ranges are approximate and that CNT length can also be modulated by reaction temperatures, and carrier and carbon feedstock concentrations and flow rates.

In some embodiments, continuous processes for CNS growth can include (a) disposing a carbon nanotube-forming catalyst on a surface of a fiber material of spoolable dimensions; and (b) synthesizing carbon nanotubes directly on the fiber material, thereby forming a CNS-laden fiber material. For a 9 foot long system, the linespeed of the process can range from between about 1.5 ft/min to about 108 ft/min. The linespeeds achieved by the process described herein allow the formation of commercially relevant quantities of CNS-laden fiber materials with short production times. For example, at 36 ft/min linespeed, the quantities of CNS-laden fibers (over 5% CNTs on fiber by weight) can exceed over 100 pound or more of material produced per day in a system that is designed to simultaneously process 5 separate tows (20 lb/tow). Systems can be made to produce more tows at once or at faster speeds by repeating growth zones.

As described further below the catalyst can be prepared as a liquid solution that contains CNT-forming catalyst that contains transition metal nanoparticles. The diameters of the synthesized nanotubes are related to the size of the transition metal nanoparticles as described above. In some embodiments, commercial dispersions of CNT-forming transition metal nanoparticle catalysts are available and can be used without dilution, and in other embodiments commercial dispersions of catalyst can be diluted. Whether to dilute such solutions can depend on the desired density and length of CNT to be grown as described above.

Carbon nanotube synthesis can be based on a chemical vapor deposition (CVD) process and occurs at elevated temperatures. The specific temperature is a function of catalyst choice, but will typically be in a range of about 500° C. to about 1000° C. This operation involves heating the fiber material to a temperature in the aforementioned range to support carbon nanotube synthesis.

CVD-promoted nanotube growth on the catalyst-laden fiber material is then performed. The CVD process can be promoted by, for example, a carbon-containing feedstock gas such as acetylene, ethylene, methane, and/or propane. The CNT synthesis processes generally use an inert gas (nitrogen, argon, helium) as a primary carrier gas. The carbon feedstock is generally provided in a range from between about 0% to about 50% of the total mixture. A substantially inert environment for CVD growth is prepared by removal of moisture and oxygen from the growth chamber.

The operation of disposing a catalyst on the fiber material can be accomplished by spraying or dip coating a solution or by gas phase deposition via, for example, a plasma process. Thus, in some embodiments, after forming a solution of a catalyst in a solvent, catalyst can be applied by spraying or dip coating the fiber material with the solution, or combinations of spraying and dip coating. Either technique, used alone or in combination, can be employed once, twice, thrice, four times, up to any number of times to provide a fiber material that is sufficiently uniformly coated with CNT-forming catalyst. When dip coating is employed, for example, a fiber material can be placed in a first dip bath for a first residence time in the first dip bath. When employing a second dip bath, the fiber material can be placed in the second dip bath for a second residence time. For example, fiber materials can be subjected to a solution of CNT-forming catalyst for between about 3 seconds to about 90 seconds depending on the dip configuration and linespeed. Employing spraying or dip coating processes, a fiber material with a surface density of catalyst of less than about 5% surface coverage to as high as about 80% coverage, in which the CNT-forming catalyst nanoparticles are nearly monolayer. In some embodiments, the process of coating the CNT-forming catalyst on the fiber material should produce no more than a monolayer. For example, CNT growth on a stack of CNT-forming catalyst can erode the degree of infusion of the CNT to the fiber material. In other embodiments, the transition metal catalyst can be deposited on the fiber material using evaporation techniques, electrolytic deposition techniques, and other deposition processes, such as addition of the transition metal catalyst to a plasma feedstock gas as a metal organic, metal salt or other composition promoting gas phase transport.

Because processes for growing carbon nanostructures are designed to be continuous, a spoolable fiber material can be dip-coated in a series of baths where dip coating baths are spatially separated. In continuous processes in which nascent fibers are being generated de novo, dip bath or spraying of CNT-forming catalyst can be the first step. In other embodiments, the CNT-forming catalyst can be applied to newly formed fibers in the presence of other sizing agents. Such simultaneous application of CNT-forming catalyst and other sizing agents can provide the CNT-forming catalyst in the surface of the sizing on the fiber material to create a poorly adhered CNT coating.

The catalyst solution employed can be a transition metal nanoparticle which can be any d-block transition metal, as described above. In addition, the nanoparticles can include alloys and non-alloy mixtures of d-block metals in elemental form or in salt form, and mixtures thereof. Such salt forms include, without limitation, oxides, carbides, acetates, and nitrides. Non-limiting exemplary transition metal NPs include Ni, Fe, Co, Mo, Cu, Pt, Au, and Ag and salts thereof and mixtures thereof. In some embodiments, such CNT-forming catalysts are disposed on the fiber by applying or infusing a CNT-forming catalyst directly to the fiber material simultaneously with barrier coating deposition. Many of these transition metal catalysts are readily commercially available from a variety of suppliers, including, for example, Sigma Aldrich (St. Louis, Mo.) or Ferrotec Corporation (Bedford, N.H.).

Catalyst solutions used for applying the CNT-forming catalyst to the fiber material can be in any common solvent that allows the CNT-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the CNT-forming catalyst nanoparticles. Concentrations of CNT-forming catalyst can be in a range from about 1:1 to 1:10000 catalyst to solvent. Such concentrations can be used when the barrier coating and CNT-forming catalyst are applied simultaneously as well.

In some embodiments heating of the fiber material can be at a temperature that is between about 500° C. and about 1000° C. to synthesize carbon nanotubes after deposition of the CNT-forming catalyst. Heating at these temperatures can be performed prior to or substantially simultaneously with introduction of a carbon feedstock for CNT growth.

Catalyst solutions used for applying the CNT-forming catalyst to the fiber material can be in any common solvent that allows the CNT-forming catalyst to be uniformly dispersed throughout. Such solvents can include, without limitation, water, acetone, hexane, isopropyl alcohol, toluene, ethanol, methanol, tetrahydrofuran (THF), cyclohexane or any other solvent with controlled polarity to create an appropriate dispersion of the CNT-forming catalyst nanoparticles. Concentrations of CNT-forming catalyst can be in a range from about 1:1 to 1:10000 catalyst to solvent. Such concentrations can be used when the barrier coating and CNT-forming catalyst are applied simultaneously as well.

In some embodiments heating of the fiber material can be at a temperature that is between about 500° C. and about 1000° C. to synthesize carbon nanotubes after deposition of the CNT-forming catalyst. Heating at these temperatures can be performed prior to or substantially simultaneously with introduction of a carbon feedstock for CNT growth.

In some embodiments, the processes for producing a carbon nanostructure include removing a sizing agent from a fiber material, applying an adhesion-inhibiting coating (i.e., an anti-adhesive coating) conformally over the fiber material, applying a CNT-forming catalyst to the fiber material, heating the fiber material to at least 500° C., and synthesizing carbon nanotubes on the fiber material. In some embodiments, operations of the CNS-growth process can include removing sizing from a fiber material, applying an adhesion-inhibiting coating to the fiber material, applying a CNT-forming catalyst to the fiber, heating the fiber to CNT-synthesis temperature and performing CVD-promoted CNS growth on the catalyst-laden fiber material. Thus, where commercial fiber materials are employed, processes for constructing CNS-laden fibers can include a discrete step of removing sizing from the fiber material before disposing adhesion-inhibiting coating and the catalyst on the fiber material.

Synthesizing carbon nanotubes on the fiber material can include numerous techniques for forming carbon nanotubes, including those disclosed in co-pending U.S. Patent Application Publication No. 2004/0245088, which is incorporated herein by reference. The CNS grown on the fibers can be formed by techniques such as, for example, micro-cavity, thermal or plasma-enhanced CVD techniques, laser ablation, arc discharge, and high pressure carbon monoxide (HiPCO). In some embodiments, any conventional sizing agents can be removed prior CNT synthesis. In some embodiments, acetylene gas can be ionized to create a jet of cold carbon plasma for CNT synthesis. The plasma is directed toward the catalyst-bearing fiber material. Thus, in some embodiments for synthesizing CNS on a fiber material include (a) forming a carbon plasma; and (b) directing the carbon plasma onto the catalyst disposed on the fiber material. The diameters of the CNTs that are grown are dictated by the size of the CNT-forming catalyst as described above. In some embodiments, the sized fiber material is heated to between about 550° C. to about 800° C. to facilitate CNS synthesis. To initiate the growth of CNTs, two gases are bled into the reactor: a process gas such as argon, helium, or nitrogen, and a carbon-containing gas, such as acetylene, ethylene, ethanol or methane. CNTs grow at the sites of the CNT-forming catalyst.

In some embodiments, the CVD growth is plasma-enhanced. A plasma can be generated by providing an electric field during the growth process. CNTs grown under these conditions can follow the direction of the electric field. Thus, by adjusting the geometry of the reactor, vertically aligned carbon nanotubes can be grown radially about a cylindrical fiber. In some embodiments, a plasma is not required for radial growth about the fiber. For fiber materials that have distinct sides such as tapes, mats, fabrics, plies, and the like, catalyst can be disposed on one or both sides and correspondingly, CNTs can be grown on one or both sides as well.

As described above, CNS-synthesis can be performed at a rate sufficient to provide a continuous process for functionalizing spoolable fiber materials. Numerous apparatus configurations facilitate such continuous synthesis and result in the complex CNS morphology, as exemplified below.

One configuration for continuous CNS synthesis involves an optimally shaped (shaped to match the size and shape of the substrate) reactor for the synthesis and growth of carbon nanotubes directly on fiber materials. The reactor can be designed for use in a continuous in-line process for producing CNS-bearing fibers. In some embodiments, CNSs can be grown via a chemical vapor deposition ("CVD") process at atmospheric pressure and at elevated temperature in the range of about 550° C. to about 800° C. in a multi-zone reactor. The fact that the synthesis occurs at atmospheric pressure is one factor that facilitates the incorporation of the reactor into a continuous processing line for CNS-on-fiber synthesis. Another advantage consistent with in-line continuous processing using such a zoned reactor is that CNT growth occurs in a seconds, as opposed to minutes (or longer) as in other procedures and apparatus configurations typical in the art.

CNS synthesis reactors in accordance with the various embodiments include the following features:

Optimally Shaped Synthesis Reactors: Adjusting the size of the growth chamber to more effectively match the size of the substrate traveling through it improves reaction rates as well as process efficiency by reducing the overall volume of the reaction vessel. The cross section of the optimally shaped growth chamber can be maintained below a volume ratio of chamber to substrate of 10,000. In some embodiments, the cross section of the chamber is maintained at a volume ratio of below 1,000. In other embodiments, the cross section of the chamber is maintained at a volume ratio below 500.

Although gas deposition processes, such as CVD, are typically governed by pressure and temperature alone, volume has a significant impact on the efficiency of deposition. By matching the shape of the substrate with the growth chamber there is greater opportunity for productive CNS forming reactions to occur. It should be appreciated that in some embodiments, the synthesis reactor has a cross section that is described by polygonal forms according the shape of the substrate upon which the CNS is grown to provide a reduction in reactor volume. In some embodiments, gas can be introduced at the center of the reactor or within a target growth zone, symmetrically, either through the sides or through the top and bottom plates of the reactor. This improves the overall CNT growth rate because the incoming feedstock gas is continuously replenishing at the hottest portion of the system, which is where CNT growth is most active. This constant gas replenishment is an important aspect to the increased growth rate exhibited by the shaped CNT reactors.

Zoning: Chambers that provide a relatively cool purge zone depend from both ends of the synthesis reactor. Applicants have determined that if hot gas were to mix with the external environment (i.e., outside of the reactor), there would be an increase in degradation of most fiber materials. The cool purge zones provide a buffer between the internal system and external environments. Typical CNT synthesis reactor configurations known in the art typically require that the substrate is carefully (and slowly) cooled. The cool purge zone at the exit of the present CNS growth reactor achieves the cooling in a short period of time, as required for the continuous in-line processing.

Non-contact, hot-walled, metallic reactor: In some embodiments, a hot-walled reactor made of metal can be employed, in particular stainless steel. This may appear counterintuitive because metal, and stainless steel in particular, is more susceptible to carbon deposition (i.e., soot and by-product formation). Thus, most CNT reactor configurations use quartz reactors because there is less carbon deposited, quartz is easier to clean, and quartz facilitates sample observation.

However, it has been observed that the increased soot and carbon deposition on stainless steel results in more consistent, faster, more efficient, and more stable CNT growth. Without being bound by theory it has been indicated that, in conjunction with atmospheric operation, the CVD process occurring in the reactor is diffusion limited. That is, the catalyst is "overfed;" too much carbon is available in the reactor system due to its relatively higher partial pressure (than if the reactor was operating under partial vacuum). As a consequence, in an open system-especially a clean one-too much carbon can adhere to catalyst particles, compromising their ability to synthesize CNTs. In some embodiments, the rectangular reactor is intentionally run when the reactor is "dirty," that is with soot deposited on the metallic reactor walls. Once carbon deposits to a monolayer on the walls of the reactor, carbon will readily deposit over itself. Since some of the available carbon is "withdrawn" due to this mechanism, the remaining carbon feedstock, in the form of radicals, react with the catalyst at a rate that does not poison the catalyst. Existing systems run "cleanly" which, if they were open for continuous processing, would produce a much lower yield of CNTs at reduced growth rates.

Although it is generally beneficial to perform CNT synthesis "dirty" as described above, certain portions of the apparatus, such as gas manifolds and inlets, can nonetheless negatively impact the CNT growth process when soot created blockages. In order to combat this problem, such areas of the CNT growth reaction chamber can be protected with soot inhibiting coatings such as silica, alumina, or MgO. In practice, these portions of the apparatus can be dip-coated in these soot inhibiting coatings. Metals such as INVAR® can be used with these coatings as INVAR has a similar CTE (coefficient of thermal expansion) ensuring proper adhesion of the coating at higher temperatures, preventing the soot from significantly building up in critical zones.

In some embodiments, the reaction chamber may comprise SiC, alumina, or quartz as the primary chamber materials because they do not react with the reactive gases of CNS synthesis. This feature allows for increased efficiency and improves operability over long durations of operation.

Combined Catalyst Reduction and CNS Synthesis. In the CNT synthesis reactor, both catalyst reduction and CNS growth can occur within the reactor. This feature is significant because the reduction operation cannot be accomplished timely enough for use in a continuous process if performed as a discrete operation. In typical carbon nanotube synthesis processes, catalyst reduction typically takes 1-12 hours to perform. In synthesizing a carbon nanostructure according to the embodiments described herein, both catalyst reduction and CNS synthesis occur in the reactor, at least in part, due to the fact that carbon feedstock gas is introduced at the center of the reactor, not the end as would typically be performed using cylindrical reactors. The reduction process occurs as the fibers enter the heated zone; by this point, the gas has had time to react with the walls and cool off prior to reacting with the catalyst and causing the oxidation-reduction (via hydrogen radical interactions). It is this transition region where the reduction occurs. At the hottest isothermal zone in the system, the CNS growth occurs, with the greatest growth rate occurring proximal to the gas inlets near the center of the reactor.

In some embodiments, when loosely affiliated fiber materials, such as tow are employed, the continuous process can include operations that spreads out the strands and/or filaments of the tow. Thus, as a tow is unspooled it can be spread using a vacuum-based fiber spreading system, for example. When employing sized fibers, which can be relatively stiff, additional heating can be employed in order to "soften" the tow to facilitate fiber spreading. The spread fibers which comprise individual filaments can be spread apart sufficiently to expose an entire surface area of the filaments, thus allowing the tow to more efficiently react in subsequent process steps. Such spreading can approach between about 4 inches to about 6 inches across for a 3 k tow. The spread tow can pass through a surface treatment step that is composed of a plasma system as described above. After a barrier coating is applied and roughened, spread fibers then can pass through a CNT-forming catalyst dip bath. The result is fibers of the tow that have catalyst particles distributed radially on their surface. The catalyzed-laden fibers of the tow then enter an appropriate CNT growth chamber, such as the optimally shaped chamber described above, where a flow through atmospheric pressure CVD or PE-CVD process is used to synthesize the CNS at rates as high as several microns per second. The fibers of the tow, now with radially aligned CNTs in the form of the CNS morphology, exit the CNT growth reactor.

In some embodiments, CNS-laden fiber materials can pass through yet another treatment process prior to isolation that, in some embodiments is a plasma process used to functionalize the CNS. Additional functionalization of CNS can be used to promote their adhesion to particular resins. Thus, in some embodiments, the processes can provide CNS-laden fiber materials having functionalized CNS. Completing this functionalization process while the CNS are still on the fiber can improve treatment uniformity.

In some embodiments, a continuous process for growing of CNS on spoolable fiber materials can achieve a linespeed between about 0.5 ft/min to about 36 ft/min. In this embodiment where the CNT growth chamber is 3 feet long and operating at a 750° C. growth temperature, the process can be run with a linespeed of about 6 ft/min to about 36 ft/min to produce, for example, CNTs having a length between about 1 micron to about 10 microns. The process can also be run with a linespeed of about 1 ft/min to about 6 ft/min to produce, for example, CNTs having a length between about 10 microns to about 100 microns. The process can be run with a linespeed of about 0.5 ft/min to about 1 ft/min to produce, for example, CNTs having a length between about 100 microns to about 200 microns. The CNT length is not tied only to linespeed and growth temperature, however, the flow rate of both the carbon feedstock and the inert carrier gases can also influence CNT length. For example, a flow rate consisting of less than 1% carbon feedstock in inert gas at high linespeeds (6 f/min to 36 f/min) will result in CNTs having a length between 1 micron to about 5 microns. A flow rate consisting of more than 1% carbon feedstock in inert gas at high linespeeds (6 ft/min to 36 ft/min) will result in CNTs having length between 5 microns to about 10 microns.

In some embodiments, more than one material can be run simultaneously through the process. For example, multiple tapes tows, filaments, strand and the like can be run through the process in parallel. Thus, any number of pre-fabricated spools of fiber material can be run in parallel through the process and re-spooled at the end of the process. The number of spooled fiber materials that can be run in parallel can include one, two, three, four, five, six, up to any number that can be accommodated by the width of the CNT-growth reaction chamber. Moreover, when multiple fiber materials are run through the process, the number of collection spools can be less than the number of spools at the start of the process. In such embodiments, strands, tows, or the like can be sent through a further process of combining such fiber materials into higher ordered fiber materials such as woven fabrics or the like. The continuous process can also incorporate a post processing chopper that facilitates the formation CNS-laden chopped fiber mats, for example.

The continuous processing can optionally include further CNS chemistry. Because the CNS is a polymeric network of CNTs, all the chemistries associated with individualized CNTs may be carried out on the CNS materials. Such chemistries can be performed inline with CNS preparation or separately. In some embodiments, the CNS can be modified while it is still substrate-bound. This can aid in purification of the CNS material. In other embodiments, the CNS chemistry can be performed after it is removed from the substrate upon which it was synthesized. Exemplary chemistries include those described herein above in addition to fluorination, oxidation, reduction, and the like. In some embodiments, the CNS material can be used to store hydrogen. In some embodiments, the CNS structure can be modified by attachment to another polymeric structure to form a diblock polymer. In some embodiments, the CNS structure can be used as a platform for attachment of a biomolecule. In some embodiments, the CNS structure can be configured to be used as a sensor. In some embodiments, the CNS structure can be incorporated in a matrix material to form a composite material. In some embodiments, a CNS structure can be modified with reagents known to unzip CNTs and form graphene nanoribbons. Numerous other chemistries and downstream applications can be recognized by those skilled in the art.

In some embodiments, the processes allow for synthesizing a first amount of a first type of CNS on the fiber material, in which the first type of CNS comprises CNTs selected to alter at least one first property of the fiber material. Subsequently, the processes allow for synthesizing a second amount of a second type of CNS on the fiber material, in which the second type of CNS contains carbon nanotubes selected to alter at least one second property of the fiber material.

In some embodiments, the first amount and second amount of CNTs are different. This can be accompanied by a change in the CNT type or not. Thus, varying the density of CNS can be used to alter the properties of the original fiber material, even if the CNT type remains unchanged. CNT type can include CNT length and the number of walls, for example. In some embodiments the first amount and the second amount are the same. If different properties are desirable along two different stretches of the fiber material, then the CNT type can be changed, such as the CNT length. For example, longer CNTs can be useful in electrical/thermal applications, while shorter CNTs can be useful in mechanical strengthening applications.

Electrical conductivity or specific conductance is a measure of a material's ability to conduct an electric current. CNTs with particular structural parameters such as the degree of twist, which relates to CNT chirality, can be highly conducting, thus exhibiting metallic properties. A recognized system of nomenclature for CNT chirality has been formalized and is recognized by those skilled in the art. Thus, for example, CNTs are distinguished from each other by a double index (n,m) where n and m are integers that describe the cut and wrapping of hexagonal graphite so that it makes a tube when it is wrapped onto the surface of a cylinder and the edges are sealed together. When the two indices are the same, m=n, the resultant tube is said to be of the "arm-chair" (or n,n) type, since when the tube is cut perpendicular to the CNT axis only the sides of the hexagons are exposed and their pattern around the periphery of the tube edge resembles the arm and seat of an arm chair repeated n times. Arm-chair CNTs, in particular SWNTs, are metallic, and have extremely high electrical and thermal conductivity. In addition, such SWNTs have extremely high tensile strength.

In addition to the degree of twist, CNT diameter also effects electrical conductivity. As described above, CNT diameter can be controlled by use of controlled size CNT-forming catalyst nanoparticles. CNTs can also be formed as semi-conducting materials. Conductivity in multi-walled CNTs (MWNTs) can be more complex. Interwall reactions within MWNTs can redistribute current over individual tubes non-uniformly. By contrast, there is no change in current across different parts of metallic single-walled nanotubes (SWNTs). Carbon nanotubes also have very high thermal conductivity, comparable to diamond crystal and in-plane graphite sheets. Any of these characteristic properties of CNTs can be exhibited in a CNS. In some embodiments, the CNS can facilitate realization of property enhancements in materials in which the CNS is incorporated to a degree that is greater than that of individualized CNTs.

Although the invention has been described with reference to the disclosed embodiments, those skilled in the art will readily appreciate that these are only illustrative of the invention. It should be understood that various modifications can be made without departing from the spirit of the invention. The invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is the following:

1. A method comprising:
   providing a three-dimensional printed object, the printed object being formed from a printing composition comprising a solidifiable matrix and a microwave absorber dispersed in the solidifiable matrix; and
   applying a focused input of microwave radiation to the printed object at one or more locations, thereby heating the microwave absorber at the one or more locations and promoting consolidation of the printing composition within the printed object,
   wherein the microwave absorber comprises a plurality of carbon nanostructures dispersed in the solidifiable matrix, the carbon nanostructures comprising a plurality of carbon nanotubes that are branched, crosslinked, and share common walls with one another, and
   wherein the carbon nanostructures are free of a growth substrate and are in the form of a flake material.

2. The method of claim 1, wherein providing the three-dimensional printed object comprises forming the printed object in a layer-by-layer deposition process, the focused input of microwave radiation being applied after formation of the printed object is complete.

3. The method of claim 1, wherein heating of the microwave absorber promotes consolidation of an outer layer of the printed object to an inner layer of the printed object.

4. The method of claim 1, wherein heating of the microwave absorber promotes smoothing of an exterior surface of the printed object.

5. The method of claim 1, wherein heating of the microwave absorber promotes repair of damage within the printed object.

6. The method of claim 1, wherein the focused input of microwave radiation is supplied from a microwave transmission line, the microwave transmission line exhibiting a standing wave therein;
wherein the standing wave contacts the printed object at one or more locations and heats the carbon nanostructures therein.

7. The method of claim 6, wherein the standing wave tangentially contacts an exterior surface of the printed object.

8. The method of claim 6, wherein the standing wave contacts the printed object at a single location.

9. The method of claim 1, wherein the microwave radiation has a frequency of about 10 GHz or higher.

10. The method of claim 1, wherein the solidifiable matrix comprises a thermoplastic polymer.

11. A method comprising:
depositing a printing composition in a layer-by-layer deposition process to form a three-dimensional printed object;
wherein the printing composition comprises a solidifiable matrix and a plurality of carbon nanostructures dispersed in the solidifiable matrix, the carbon nanostructures comprising a plurality of carbon nanotubes that are branched, crosslinked, and share common walls with one another;
placing a microwave transmission line in proximity to the printed object;
establishing a standing wave in the microwave transmission line; and
after depositing the printing composition to form the printed object, contacting the standing wave with the printed object at one more locations, thereby heating the carbon nanostructures at the one or more locations and promoting consolidation of the printing composition within the printed object.

12. The method of claim 11, wherein the carbon nanostructures are free of a growth substrate and are in the form of a flake material.

13. The method of claim 11, wherein the microwave radiation has a frequency of about 10 GHz or higher.

14. The method of claim 11, wherein the solidifiable matrix comprises a thermoplastic polymer.

15. The method of claim 11, wherein the standing wave contacts the printed object at a single location.

16. A method comprising:
providing a three-dimensional printed object, the printed object being formed from a printing composition comprising a solidifiable matrix and a microwave absorber dispersed in the solidifiable matrix; and
applying a focused input of microwave radiation to the printed object at one or more locations, thereby heating the microwave absorber at the one or more locations;
wherein heating of the microwave absorber continues until the solidifiable matrix decomposes at the one or more locations.

17. The method of claim 16, wherein the microwave absorber comprises a plurality of carbon nanostructures dispersed in the solidifiable matrix, the carbon nanostructures comprising a plurality of carbon nanotubes that are branched, crosslinked, and share common walls with one another.

18. The method of claim 17, wherein the focused input of microwave radiation is applied to the interior of the printed object.

19. The method of claim 18, wherein decomposition of the solidifiable matrix defines a cavity within the printed object.

* * * * *